(12) United States Patent
Farivar et al.

(10) Patent No.: US 12,555,345 B2
(45) Date of Patent: *Feb. 17, 2026

(54) SYSTEMS AND METHODS FOR GUIDING IMAGE SENSOR ANGLE SETTINGS IN DIFFERENT ENVIRONMENTS

(71) Applicant: Capital One Services, LLC, McLean, VA (US)

(72) Inventors: Reza Farivar, McLean, VA (US); Cody Stancil, McLean, VA (US); Rittika Adhikari, McLean, VA (US); Joseph Ford, III, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/195,293

(22) Filed: Mar. 8, 2021

(65) Prior Publication Data

US 2021/0195095 A1 Jun. 24, 2021

Related U.S. Application Data

(63) Continuation of application No. 16/576,283, filed on Sep. 19, 2019, now Pat. No. 10,944,898.

(51) Int. Cl.
*G06V 10/24* (2022.01)
*G06F 18/214* (2023.01)
(Continued)

(52) U.S. Cl.
CPC .......... *G06V 10/24* (2022.01); *G06F 18/214* (2023.01); *G06F 18/24* (2023.01); *G06V 10/764* (2022.01); *G06V 10/774* (2022.01); *G06V 10/82* (2022.01); *G06V 40/166* (2022.01); *H04N 23/611* (2023.01); *H04N 23/64* (2023.01); *H04N 23/695* (2023.01)

(58) Field of Classification Search
CPC .......... H04N 5/23219; H04N 5/23299; H04N 5/23222; G06K 9/00255; G06K 9/6256; G06K 9/6267
See application file for complete search history.

(56) References Cited

U.S. PATENT DOCUMENTS

| 8,320,708 B2 * | 11/2012 | Kurzweil | G06V 10/243 |
| | | | 356/138 |
| 10,235,601 B1 * | 3/2019 | Wrenninge | G06K 9/6256 |
| 2003/0180039 A1 * | 9/2003 | Kakou | H04N 5/2259 |
| | | | 348/E5.055 |

(Continued)

FOREIGN PATENT DOCUMENTS

CN 108877099 A * 11/2018

*Primary Examiner* — Gelek W Topgyal
(74) *Attorney, Agent, or Firm* — Foley & Lardner LLP

(57) ABSTRACT

A system for guiding image sensor angle settings in different environments. The system may include a memory storing executable instructions, and at least one processor configured to execute the instructions to perform operations. The operations may include obtaining a plurality of synthetic images, the synthetic images representing a plurality of scenes; training a classification model to classify, based on the synthetic images, a plurality of images captured from an environment of a user by an image sensor; determining, based on the classification, whether the image sensor is positioned at a predetermined angle; and adjusting, based on the determination, a position of the image sensor.

20 Claims, 12 Drawing Sheets

(51) Int. Cl.
*G06F 18/24* (2023.01)
*G06V 10/764* (2022.01)
*G06V 10/774* (2022.01)
*G06V 10/82* (2022.01)
*G06V 40/16* (2022.01)
*H04N 23/60* (2023.01)
*H04N 23/611* (2023.01)
*H04N 23/695* (2023.01)

(56) References Cited

U.S. PATENT DOCUMENTS

| | | | |
|---|---|---|---|
| 2005/0167482 A1* | 8/2005 | Ramachandran | G07F 19/201 |
| | | | 235/379 |
| 2010/0014775 A1* | 1/2010 | Ikeda | G06V 10/507 |
| | | | 382/274 |
| 2011/0316997 A1* | 12/2011 | Shirbabadi | G07F 19/2055 |
| | | | 348/78 |
| 2013/0100291 A1* | 4/2013 | Tan | G07F 19/207 |
| | | | 348/150 |
| 2016/0125404 A1* | 5/2016 | Roof | G06Q 20/206 |
| | | | 705/18 |
| 2016/0364612 A1* | 12/2016 | Dixon | G06T 7/73 |
| 2017/0098305 A1* | 4/2017 | Gossow | G06T 7/80 |
| 2017/0256068 A1* | 9/2017 | Wang | G06T 7/337 |
| 2018/0059679 A1* | 3/2018 | Taimouri | G05D 1/0248 |
| 2018/0268255 A1* | 9/2018 | Surazhsky | G06N 3/08 |
| 2019/0019335 A1* | 1/2019 | Elangovan | G06T 19/20 |
| 2019/0102601 A1* | 4/2019 | Karpas | G06N 3/084 |
| 2019/0108651 A1* | 4/2019 | Gu | G06V 10/955 |
| 2020/0342652 A1* | 10/2020 | Rowell | G06T 1/0014 |
| 2022/0058811 A1* | 2/2022 | Pokhrel | G06N 3/08 |
| 2023/0177879 A1* | 6/2023 | Atkinson | G06V 40/197 |
| | | | 382/181 |

* cited by examiner

SYSTEMS AND METHODS FOR GUIDING IMAGE SENSOR ANGLE SETTINGS IN DIFFERENT ENVIRONMENTS

CROSS-REFERENCE TO RELATED APPLICATIONS

This application is a continuation of U.S. patent application Ser. No. 16/576,283, filed Sep. 19, 2019. The content of the foregoing application is incorporated herein in its entirety by reference.

BACKGROUND

In many settings, such as a bank branch, surveillance technicians may be required to follow functional and legal guidelines when positioning image sensors (or cameras) at certain angles. For instance, it may be necessary to position an image sensor on an Automated Teller Machine (ATM) so that it captures a clear view of a customer's face. Similarly, bank branch cameras may be able to capture certain angles but may be prohibited from capturing particular features of an image because of regulations. For example, a camera may, by regulation, be prohibited from capturing a keypad on an ATM. Capturing of an image of a keypad on an ATM may constitute a regulation violation and may lead to litigation, especially where a customer's privacy is compromised.

In addition to regulatory hurdles, surveillance technicians are typically limited by lacking a video feed from multiple cameras. As a result, with a single camera, surveillance technicians may position the single camera at less than an optimum angle in order to obtain the optimum video feed while still complying with privacy regulations. Alternatively, technicians may err and position a camera at a position which is not the "best" camera angle. Moreover, at different environments, technicians may have to position cameras at different angles and may be unable to determine an optimum angle to guide a camera or image sensor.

Therefore, what is needed are techniques based on machine-learning algorithms, such as convolutional neural networks, that can automatically identify whether a camera's output feed satisfies a set of required conditions. For example, what is needed is a system that identifies when cameras are not located at correct angles by testing camera angles relative to a set of synthetically generated images that satisfy regulations. The system might be able to identify such information by either learning the knowledge of what "regulation-satisfying" images look like, by training a machine learning model. Alternatively, the system may compare images coming from the camera directly with synthethic images of what it is expecting, and guiding the user to adjust the camera angles and zoom to match the camera picture with the synthethic picture. Moreover, what is needed are systems and methods that automatically correct or reposition camera angles based on the application of neural networks and comparison to classified data representing synthetic images.

Moreover, ATM "jackpotting" has also become a significant problem requiring sophisticated surveillance. Jackpotting is a process where thieves install software and/or hardware at ATMs which causes the ATMs to release significant quantities of cash at a criminal's request. As a result, techniques allowing for guiding image sensor angle settings in different environments and identifying an optimum image sensor for surveillance at ATMs is needed to detect when jackpotting may be occurring. For example, image sensors positioned at optimum angles may be able to surveil criminals that may be installing software and/or hardware at ATMs and/or deter criminals from jackpotting in the first place.

The disclosed systems and methods address one or more of the problems set forth above and/or other problems in the prior art.

SUMMARY

One aspect of the present disclosure is directed to a system for guiding image sensor angle settings in different environments. The system may include a memory storing executable instructions, and at least one processor configured to execute the instructions to perform operations. The operations may include obtaining a plurality of synthetic images, the synthetic images representing a plurality of scenes; training a classification model to classify, based on the synthetic images, a plurality of images captured from an environment of a user by an image sensor; determining, based on the classification, whether the image sensor is positioned at a predetermined angle; and adjusting, based on the determination, a position of the image sensor.

Another aspect of the present disclosure is directed to method for guiding image sensor angle settings in different environments. The method may include obtaining a plurality of synthetic images, the synthetic images representing a plurality of scenes; training a classification model to classify, based on the synthetic images, a plurality of images captured from an environment of a user by an image sensor; determining, based on the classification, whether the image sensor is positioned at a predetermined angle; and adjusting, based on the determination, a position of the image sensor.

Yet another aspect of the present disclosure is directed to a non-transitory computer-readable medium storing instructions that, when executed by a processor, cause the processor to perform operations to guide image sensor angle settings in different environments. The operations may include obtaining a plurality of synthetic images, the synthetic images representing a plurality of scenes; training a classification model to classify, based on the synthetic images, a plurality of images captured from an environment of a user by an image sensor; determining, based on the classification, whether the image sensor is positioned at a predetermined angle; and adjusting, based on the determination, a position of the image sensor.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

Figure 1:
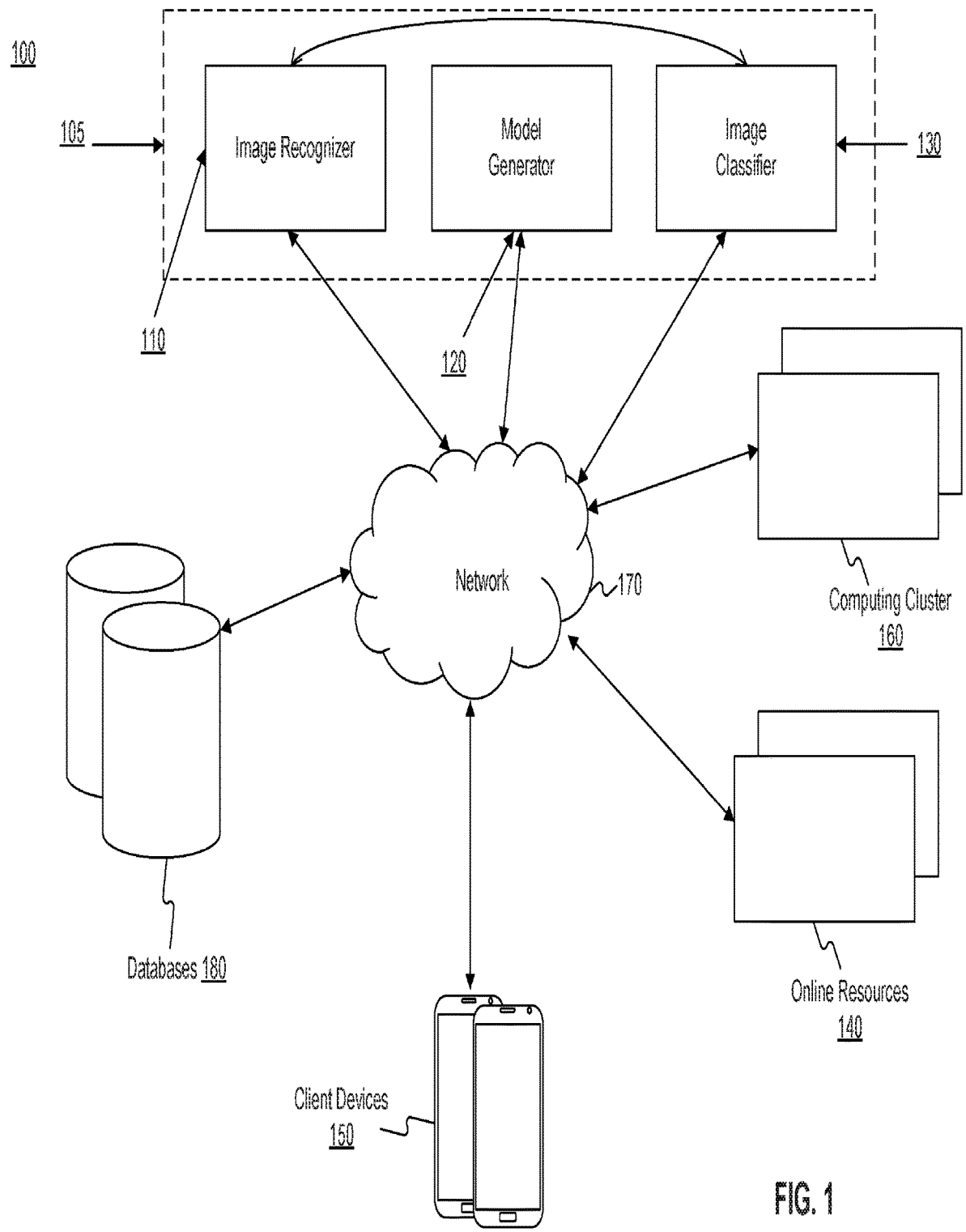
FIG. 1 is a block diagram of an exemplary image inspection system, consistent with disclosed embodiments.

FIG. 1 is a block diagram of an exemplary image inspection system 100, consistent with disclosed embodiments. System 100 may be used to identify an automated teller machine (ATM) or a bank environment, consistent with disclosed embodiments. System 100 may include an identification system 105 which may include an image recognizer 110, a model generator 120, and an image classifier 130. System 100 may additionally include online resources 140, one or more client devices 150, one or more computing clusters 160, and one or more databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages for display on an ATM interface or a bank website. In other embodiments, online resources 140 may be associated with a cloud computing service such as Microsoft Azure™ or Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of identified ATM operation or a bank visit by a user, and/or completion messages and notifications.

Client devices 150 may include one or more computing devices configured to perform one or more operations consistent with disclosed embodiments. For example, client devices 150 may include desktop computers, laptops, servers, mobile devices (e.g., tablet, smart phone, etc.), gaming devices, wearable computing device, or other types of computing devices capable of performing techniques disclosed herein. Client devices 150 may include one or more processors configured to execute software instructions stored in memory, such as memory included in client devices 150 to perform operations to implement the functions described below. Client devices 150 may include software comprised as executable instructions that, when executed, cause a processor to perform Internet-related communication and content display processes consistent with techniques disclosed herein. For instance, client devices 150 may execute browser software that generates and displays interfaces including content on a display device included in, or connected to, client devices 150. Client devices 150 may execute applications that allows client devices 150 to communicate with components over network 170, and generate and display content in interfaces via display devices included in client devices 150. The display devices may be configured to display synthetic images shown in FIG. 11 and other ATM, bank, or user images. Synthetic images may be a digital representation of a real images as captured by a camera, or may be a digital representation fabricated by identification system 105.

Figure 6:
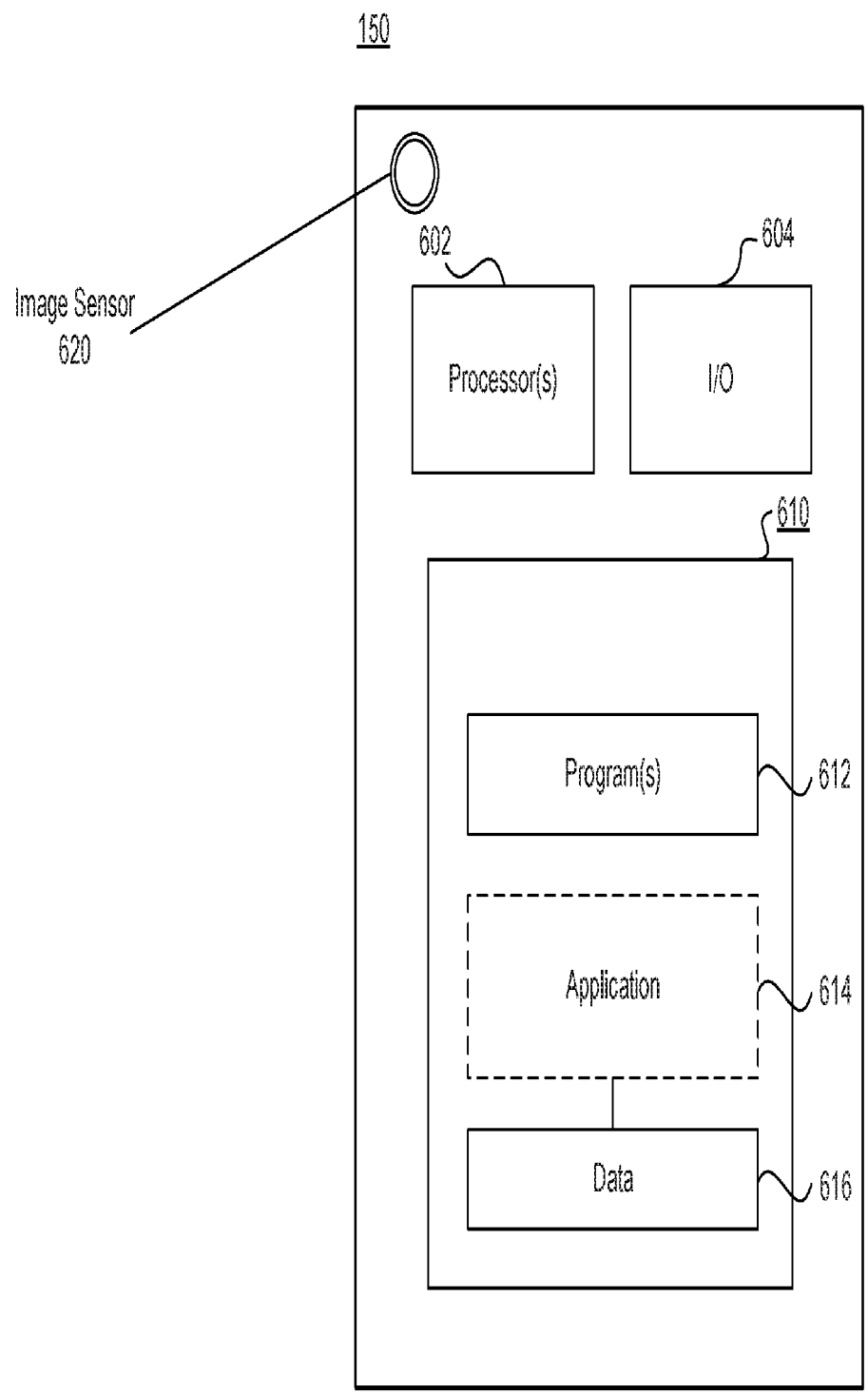
FIG. 6 is a block diagram of an exemplary client device, consistent with disclosed embodiments.

The disclosed embodiments are not limited to any particular configuration of client devices 150. For instance, a client device 150 may be a mobile device that stores and executes mobile applications to perform operations that provide functions offered by identification system 105 and/or online resources 140, such as providing information about ATM transactional or financial account data in a database 180. In certain embodiments, client devices 150 may be configured to execute software instructions relating to location services, such as GPS locations. For example, client devices 150 may be configured to determine a geographic location and provide location data and time stamp data corresponding to the location data. In yet other embodiments, client devices 150 may employ image sensors (as shown in FIG. 6) to capture video and/or images in an environment of a user (e.g., at an ATM or inside a bank).

Computing clusters 160 may include a plurality of computing devices in communication. For example, in some embodiments, computing clusters 160 may be a group of processors in communication through fast local area networks. In other embodiments, computing clusters 160 may be an array of graphical processing units configured to work in parallel as a GPU cluster. In such embodiments, computer cluster may include heterogeneous or homogeneous hardware. In some embodiments, computing clusters 160 may include a GPU driver for each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster. In yet other embodiments, computing clusters 160 may operate with distcc (a program to distribute builds of C, C++, Objective C or Objective C++ code across several machines on a network to speed up building), and MPICH (a standard for message-passing for distributed-memory applications used in parallel computing), Linux Virtual Server™, Linux-HA™, or other director-based clusters that allow incoming requests for services to be distributed across multiple cluster nodes.

Databases 180 may include one or more computing devices configured with appropriate software to perform operations consistent with providing identification system 105, image recognizer 110, model generator 120, and image classifier 130 with data associated with user images, ATM images, bank images, financial account characteristics, and stored information about user operation of ATMs and visits to banks. Databases 180 may include, for example, Oracle™ databases, Sybase™ databases, or other relational databases or non-relational databases, such as Hadoop™ sequence files, HBase™, or Cassandra™, or cloud-based database systems such as Amazon AWS DynamoDB™ or Aurora™. Database(s) 180 may include computing components (e.g., database management system, database server, etc.) configured to receive and process requests for data stored in memory devices of the database(s) and to provide data from the database(s).

While databases 180 are shown separately, in some embodiments databases 180 may be included in or otherwise related to one or more of identification system 105, image recognizer 110, model generator 120, image classifier 130, and online resources 140.

Databases 180 may be configured to collect and/or maintain the data associated with financial information being displayed in online resources 140 and provide it to the identification system 105, image recognizer 110, model generator 120, image classifier 130, and client devices 150. Databases 180 may collect the data from a variety of sources, including, for instance, online resources 140. Databases 180 are further described below in connection with FIG. 5.

Image classifier 130 may include one or more computing systems that collects images and processes them to create training data sets that can be used to develop an identification model. For example, image classifier 130 may include an image collector 410 (FIG. 4) that collects images that are then used for training a logistic regression model, convolutional neural network, and supervised machine learning classification techniques. In some embodiments, image classifier 130 may be in communication with online resources 140 and detect changes in the online resources 140 to collect images and begin the classification process.

Model generator 120 may include one or more computing systems configured to generate models to identify an ATM using an image of an environment of an ATM or a bank branch using an image of the inside of a bank branch. Model generator 120 may receive or obtain information from databases 180, computing clusters 160, online resources 140, and image classifier 130. For example, model generator 120 may receive a plurality of images from databases 180 and online resources 140. Model generator 120 may also receive images and metadata from image classifier 130.

Figure 11:
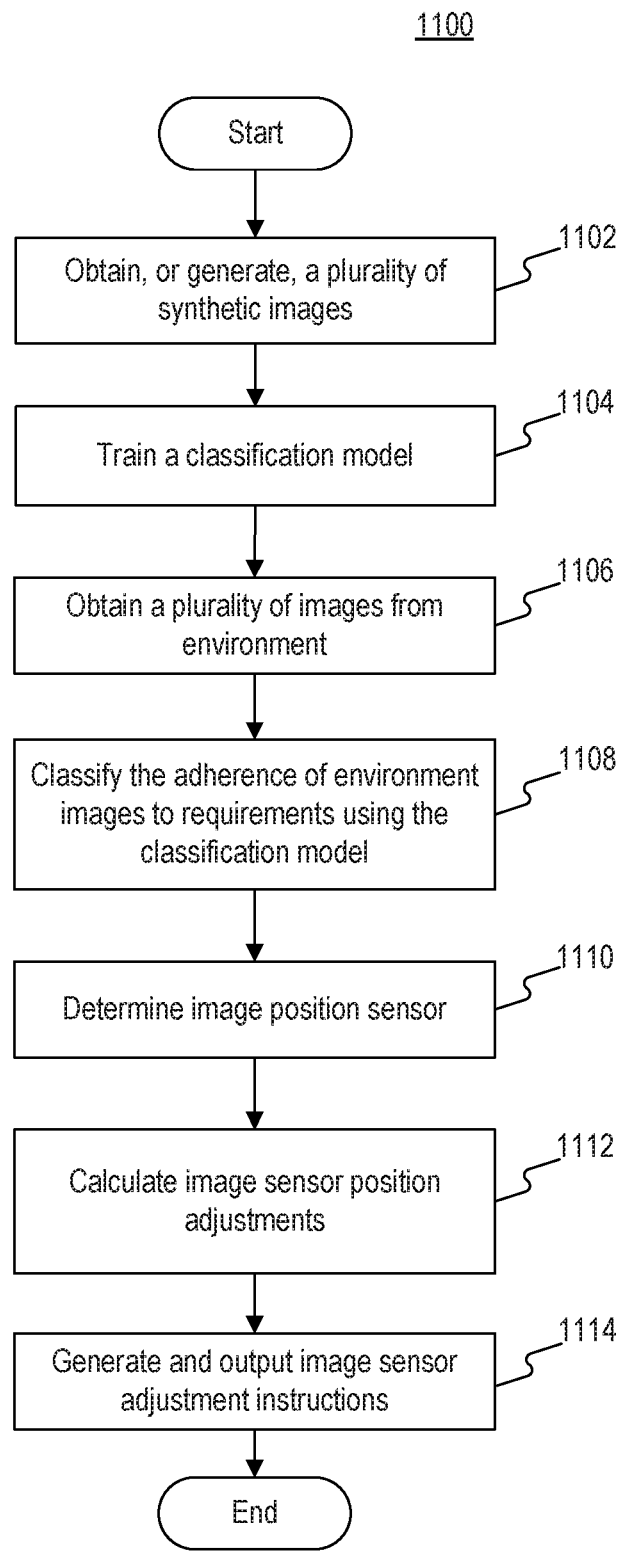
FIG. 11 depicts a flowchart of a first exemplary process for guiding image sensor angle settings in different environments, consistent with disclosed embodiments.

In some embodiments, model generator 120 may generate one or more identification models after a plurality of synthetic images are obtained or generated by inspection system 105 (see FIG. 11). Synthetic images may be a digital representation of a real images as captured by a camera or may be a digital representation fabricated by identification system 105. Identification models may be generated to include statistical algorithms that are used to determine the similarity between images given a set of training images. The training images may be synthetically generated images. For example, identification models may be convolutional neural networks that determine attributes in a figure based on extracted parameters. However, identification models may also include regression models that estimate the relationships among input and output variables. Identification models may additionally sort elements of a dataset using one or more classifiers to determine the probability of a specific outcome. Identification models may be parametric, non-parametric, and/or semi-parametric models.

In some embodiments, identification models may represent an input layer and an output layer connected via nodes with different activation functions as in a convolutional neural network. "Layers" in the neural network may transform an input variable into an output variable (e.g., holding class scores) through a differentiable function. The convolutional neural network may include multiple distinct types of layers. For example, the network may include a convolution layer, a pooling layer, a ReLU Layer, a number of filter layers, a filter shape layer, and/or a loss layer. Further, the convolution neural network may comprise a plurality of nodes. Each node may be associated with an activation function and each node may be connected with other nodes via synapses that are associated with a weight.

The neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Identification models may also include Random Forests, composed of a combination of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Identification models may additionally or alternatively include classification and regression trees, or other types of models known to those skilled in the art. Model generator 120 may submit models to identify an ATM or bank. To generate identification models, model generator 120 may analyze images that are classified by the image classifier 130 applying machine-learning methods. Model generator 120 is further described below in connection with FIG. 3.

Image recognizer 110 may include one or more computing systems configured to perform operations consistent with identifying a plurality of camera angles. In some embodiments, image recognizer 110 may receive a request to identify an image. Image recognizer 110 may receive the request directly from client devices 150. Alternatively, image recognizer 110 may receive the request from other components of system 100. For example, client devices 150 may send requests to online resources 140, which then sends requests to identification system 105. The request may include an image of an ATM or an environment of a bank and a location of client devices 150. Additionally, in some embodiments the request may specify a date and preferences. In other embodiments, the request may include a video file or a streaming video feed.

As an alternative embodiment, identification system 105 may initiate identification models using model generator 120 as a response to an identification request. The request may include information about the image source, for example, an identification of client device 150. The request may additionally specify a location, along with the angle or position at which the client device 150 and any associated image sensor(s) are placed. In addition, image recognizer 110 may retrieve information from databases 180. In other embodiments, identification system 105 may handle identification requests with image recognizer 110 and retrieve a previously developed model by model generator 120.

Figure 12:
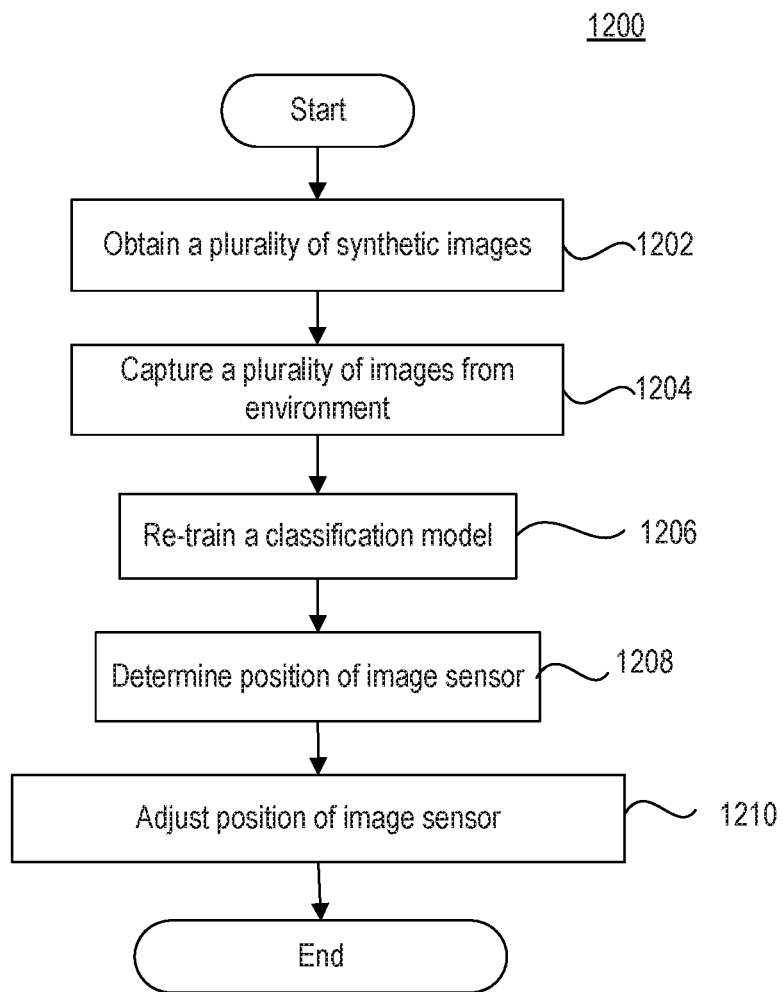
FIG. 12 depicts a flowchart of a second exemplary process for guiding image sensor angle settings in different environments, consistent with disclosed embodiments.

In alternative embodiments, model generator 120 may receive requests from image recognizer 110 to fine tune a model by re-training the model using a new batch of synthetic pictures. As part of a reinforcement learning process (as shown in FIG. 12), model generator 120 may re-train one or more identification models. Identification models may be re-trained to include statistical algorithms that are used to determine the similarity between images given a set of training images. The re-trained images may be synthetically generated images. For example, identification models may be re-trained as convolutional neural networks that determine attributes in a figure based on extracted parameters. However, identification models may also be re-trained to include regression models that estimate the relationships among input and output variables. Identification models may additionally be re-trained to sort elements of a dataset using one or more classifiers to determine the probability of a specific outcome. Re-trained dentification models may be parametric, non-parametric, and/or semi-parametric models.

In some embodiments, image recognizer 110 may generate an identification result based on the information received from the client device request and transmit the information to the client device. Image recognizer 110 may generate instructions to modify a graphical user interface to include identification information associated with the received image. Image recognizer 110 is further described below in connection with FIG. 2.

FIG. 1 shows image recognizer 110, model generator 120, and image classifier 130 as different components. However, image recognizer 110, model generator 120, and image classifier 130 may be implemented in the same computing system. For example, all elements in identification system 105 may be embodied in a single server.

Network 170 may be any type of network configured to provide communications between components of system 100. For example, network 170 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 described herein are exemplary. Alternative configurations and boundaries can be implemented so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
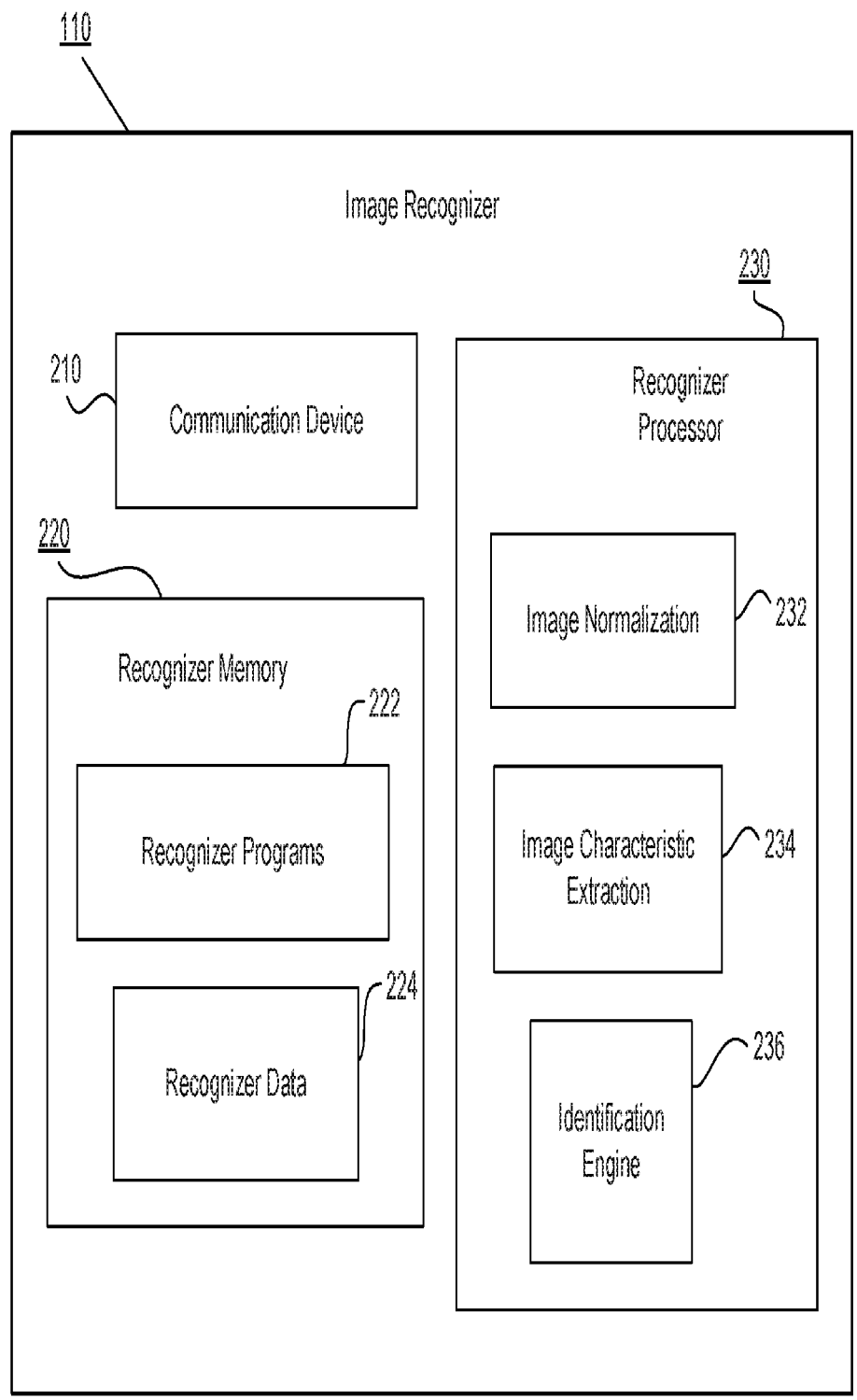
FIG. 2 is a block diagram of an exemplary image recognizer, consistent with disclosed embodiments.

FIG. 2 shows a block diagram of an exemplary image recognizer 110, consistent with disclosed embodiments. Image recognizer 110 may include a communication device 210, a recognizer memory 220, and one or more recognizer processors 230. Recognizer memory 220 may include recognizer programs 222 and recognizer data 224. Recognizer processor 230 may include an image normalization module 232, an image characteristic extraction module 234, and an identification engine 236.

In some embodiments, image recognizer 110 may take the form of a server, a general purpose computer, a mainframe computer, or any combination of these components. In other embodiments, image recognizer 110 may be a virtual machine. Other implementations consistent with disclosed embodiments are possible as well.

Communication device 210 may be configured to communicate with one or more databases, such as databases 180 described above, either directly, or via network 170. In particular, communication device 210 may be configured to receive from model generator 120 a model to identify ATM, bank, or user attributes in an image and client images from client devices 150. In addition, communication device 210 may be configured to communicate with other components as well, including, for example, databases 180 and image classifier 130.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Recognizer memory 220 may include one or more storage devices configured to store instructions used by recognizer processor 230 to perform functions related to disclosed embodiments. For example, recognizer memory 220 may store software instructions, such as recognizer program 222, that may perform operations when executed by recognizer processor 230. The disclosed embodiments are not limited to separate programs or computers configured to perform dedicated tasks. For example, recognizer memory 220 may include a single recognizer program 222 that performs the functions of image recognizer 110, or recognizer program 222 may comprise multiple programs. Recognizer memory 220 may also store recognizer data 224 that is used by recognizer program(s) 222.

In certain embodiments, recognizer memory 220 may store sets of instructions for carrying out processes to identify a camera or image sensor angle or position from an image, generate a list of identified attributes, and/or generate instructions to display a modified graphical user interface. In certain embodiments, recognizer memory 220 may store sets of instructions for identifying whether an image is acceptable for processing and generate instructions to guide an image sensor to re-position itself to take a picture at a different angle so as to maintain user privacy and/or comply with legal regulations for image taking. Other instructions are possible as well. In general, instructions may be executed by recognizer processor 230 to perform operations consistent with disclosed embodiments.

In some embodiments, recognizer processor 230 may include one or more known processing devices, such as, but not limited to, single-core or multi-core microprocessors manufactured by companies such as Intel™, AMD™, Samsung™, Qualcomm™, Apple™, or any of various known processors from other manufacturers capable of being configured to perform the functions disclosed herein. In some embodiments, recognizer processor 230 may be a distributed processor comprising a plurality of devices coupled and configured to perform functions consistent with the disclosure.

In some embodiments, recognizer processor 230 may execute software to perform functions associated with each component of recognizer processor 230. In other embodiments, each component of recognizer processor 230 may be an independent device. In such embodiments, each component may be a hardware device configured to specifically process data or perform operations associated with modeling hours of operation, generating identification models and/or handling large data sets. For example, image normalization module 232 may be a field-programmable gate array (FPGA), image characteristic extraction module 234 may be a graphics processing unit (GPU), and identification engine 236 may be a central processing unit (CPU). Other hardware combinations are also possible. In yet other embodiments, combinations of hardware and software may be used to implement recognizer processor 230.

Image normalization module 232 may normalize a received image so it can be identified in the model. For example, communication device 210 may receive an image from client devices 150 to be identified which may include identifying an image sensor angle for capturing the image. The image may be in a format that cannot be processed by image recognizer 110 because it is in an incompatible format or may have parameters that cannot be processed. For example, the received image may be received in a specific format, such as a High Efficiency Image File Format (HEIC), or in a vector image format, such as Computer Graphic Metafile (CGM). Then, image normalization module 232 may convert the received image to a standard format such as JPEG or TIFF. Alternatively or additionally, the received image may have an aspect ratio that is incompatible with an identification model. For example, the image may have a 2.39:1 ratio which may be incompatible with the identification model. Then, image normalization module 232 may convert the received image to a standard aspect ratio such as 4:3. In some embodiments, the normalization may be guided by a model image. For example, a model image stored in recognizer data 224 may be used to guide the transformations of the received image.

In some embodiments, recognizer processor 230 may implement image normalization module 232 by executing instructions of an application in which images are received and transformed. In other embodiments, however, image normalization module 232 may be a separate hardware device or group of devices configured to carry out image operations. For example, to improve performance and speed of the image transformations, image normalization module 232 may be an SRAM-based FPGA that functions as image normalization module 232. Image normalization module 232 may have an architecture designed for implementation of specific algorithms. For example, image normalization module 232 may include a Simple Risc Computer (SRC) architecture or other reconfigurable computing system.

Image characteristic extraction module 234 may extract characteristics from a received image or a normalized image. In some embodiments, characteristics may be extracted from an image by applying a pre-trained convolutional neural network. For example, in some embodiments, pre-trained networks such as Inception-v3 or AlexNet may be used to automatically extract characteristics from a target image, such as the position at which an image sensor is arranged in order to capture the image. In such embodiments, characteristic extraction module 234 may import layers of a pre-trained convolutional network, determine characteristics described in a target layer of the pre-trained convolutional network, and initialize a multiclass fitting model using the characteristics in the target layer and images received for extraction.

In other embodiments, deep learning models such as Fast R-CNN (convolutional neural network) can be used for automatic characteristic extraction. In yet other embodiments, processes such as histogram of oriented gradients (HOG), speeded-up robust characteristics (SURF), local binary patterns (LBP), color histogram, or Haar wavelets may also be used to extract characteristics from a received image, including an image capture angle or position. In some embodiments, image characteristic extraction module 234 may partition the image into a plurality of channels and a plurality of portions, such that the channels determine a histogram of image intensities, determine characteristic vectors from intensity levels, and identify objects in a region of interest. Image characteristic extraction module 234 may perform other techniques to extract characteristics from received images.

This model and other models may perform image characteristic extraction 234 to identify an ideal angle for an image sensor according to the following equation:

$$\text{Distance to object(mm)} = \frac{f(\text{mm}) \times \text{real height(mm)} \times \text{image height(pixels)}}{\text{object height(pixels)} \times \text{sensor height(mm)}}$$

With this common equation for calculating a distance to an object, statistical models consistent with this disclosure may determine an ideal image sensor angle using the heights of known objects in the background. For example, consider a door in the background of the image. With a common door height of 6 feet 8 inches (real height), the pixels of the image may be calculated (image height), by deep learning models such as Fast R-CNN (or other models) to identify the door. As a result, the model may estimate the height of the door in pixels (object height), and the sensor height may be determined from the install specifications for an ATM and for an associated positioned image sensor. Additionally, the focal length of the image sensor may be pre-set for calculation in relation to the distance to the object.

In other aspects, where the object is centered within a captured image frame, a model may first calculate an image angle change on a vertical axis with pixel height and object height as a fixed ratio to determine how far down or up (in terms of pixels) the image sensor needs to move or be repositioned along the vertical axis. With two known side lengths of a triangle, the model may determine what the angle of the image sensor currently is. In particular, the model may calculate an inverse tangent of the distance from a bottom of the door to the top of the image frame and distance to an object and the inverse tangent of the desired distance down as well as the distance to object. This determination may be repeated for a horizontal axis to determine the desired change in position and desired change of the image sensor angle so as to place the image sensor at an ideal angle.

Recognizer processor 230 may implement image characteristic extraction module 234 by executing software to create an environment for extracting other image characteristics. However, in other embodiments, image characteristic extraction module 234 may include independent hardware devices with specific architectures designed to improve the efficiency of aggregation or sorting processes. For example, image characteristic extraction module 234 may be a GPU array configured to partition and analyze layers in parallel. Alternatively or additionally, image characteristic extraction module 234 may use TensorFlow, Keras, or similar platforms when extracting image characteristics. Image characteristic extraction module 234 may also be configured to implement a programming interface, such as Apache Spark, and execute data structures, cluster managers, and/or distributed storage systems. For example, image characteristic extraction module 234 may include a resilient distributed dataset that is manipulated with a standalone software framework and/or a distributed file system.

Identification engine 236 may calculate correlations between a received image and stored attributes based on one or more identification models. For example, identification engine 236 may use a model from model generator 120 and apply inputs based on a received image or received image characteristics to generate an attribute list associated with the received image.

Identification engine 236 may be implemented by recognizer processor 230. For example, recognizer processor 230 may execute software to create an environment to execute models from model generator 120. However, in other embodiments, identification engine 236 may include hardware devices configured to carry out parallel operations. Some hardware configurations may improve the efficiency of calculations, particularly when multiple calculations are being processed in parallel. For example, identification engine 236 may include multicore processors or computer clusters to divide tasks and quickly perform calculations. In some embodiments, identification engine 236 may receive a plurality of models from model generator 120. In such embodiments, identification engine 236 may include a scheduling module. The scheduling module may receive models and assign each model to independent processors or cores. In other embodiments, identification engine 236 may be FPGA Arrays to provide greater performance and determinism.

The components of image recognizer 110 may be implemented in hardware, software, or a combination of both, as will be apparent to those skilled in the art. For example, although one or more components of image recognizer 110 may be implemented as computer processing instructions embodied in computer software, all or a portion of the functionality of image recognizer 110 may be implemented in dedicated hardware. For instance, groups of GPUs and/or FPGAs, running a neural network model on top of TensorFlow, Keras, or similar platforms, may be used to quickly analyze data in recognizer processor 230.

Figure 3:
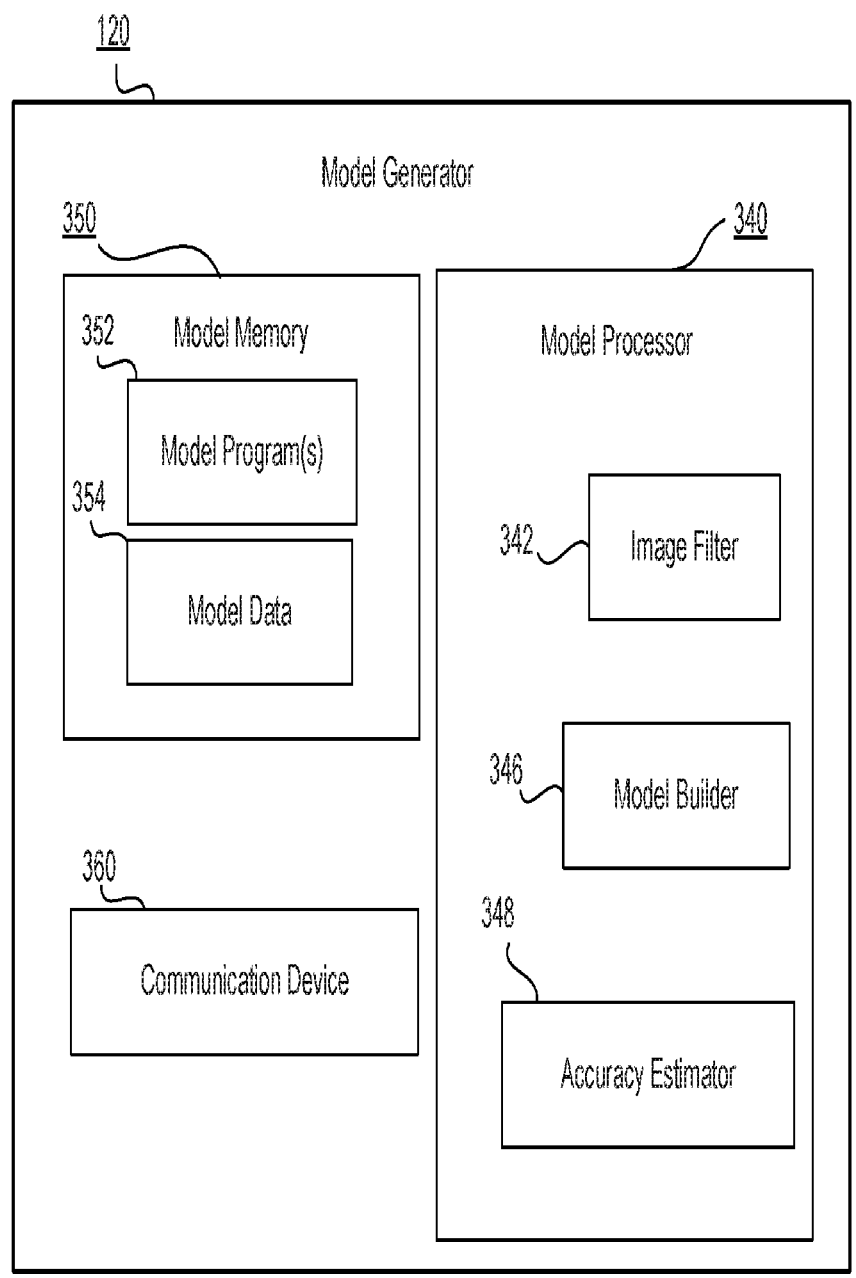
FIG. 3 is a block diagram of an exemplary model generator, consistent with disclosed embodiments.

Referring now to FIG. 3, there is shown a block diagram of an exemplary model generator, consistent with disclosed embodiments. Model generator 120 may include a model processor 340, a model memory 350, and a communication device 360.

Model processor 340 may be embodied as a processor similar to recognizer processor 230. Model processor may include an image filter 342, a model builder 346, and an accuracy estimator 348.

Image filter 342 may be implemented in software or hardware configured to generate additional images to enhance the training data set used by model builder 346. One challenge in implementing portable identification systems using convolutional neural networks is the lack of uniformity in the images received from mobile devices. To enhance accuracy and reduce error messages requesting the user to take and send new images, image filter 342 may generate additional images based on images already classified and labeled by image classifier 130. For example, image filter 342 may take an image and apply rotation, flipping, or shear filters to generate new images that can be used to train the convolutional neural network. These additional images may improve the accuracy of the identification model, particularly in augmented reality applications in which the images may be tilted or flipped as the user of client devices 150 takes images. In other embodiments, additional images may be based on modifying brightness or contrast of the image. In yet other embodiments, additional images may be based on modifying saturation or color hues.

Model builder 346 may be implemented in software or hardware configured to create identification models based on training data. In some embodiments, model builder 346 may generate convolutional neural networks. For example, model builder 346 may take a group of labeled images from image classifier 130 to train a convolutional neural network. In some embodiments, model builder 346 may generate nodes, synapses between nodes, pooling layers, and activation functions, to create an image sensor angle or position identification model. Model builder 346 may calculate coefficients and hyper parameters of the convolutional neural networks based on the training data set. In such embodiments, model builder 346 may select and/or develop convolutional neural networks in a backpropagation with gradient descent. However, in other embodiments, model builder 346 may use Bayesian algorithms or clustering algorithms to generate identification models. In this context, a "clustering" is a computation operation of grouping a set of objects in such a way that objects in the same group (called a "cluster") are more similar to each other than to those in other groups/clusters. In yet other embodiments, model builder 346 may use association rule mining, random forest analysis, and/or deep learning algorithms to develop models. In some embodiments, to improve the efficiency of the model generation, model builder 346 may be implemented in one or more hardware devices, such as FPGAs, configured to generate models for image sensor position and/or angle identification.

Accuracy estimator 348 may be implemented in software or hardware configured to evaluate the accuracy of a model. For example, accuracy estimator 348 may estimate the accuracy of a model, generated by model builder 346, by using a validation dataset. In some embodiments, the validation data set may be a portion of a training data set, that was not used to generate the identification model. Accuracy estimator 348 may generate error rates for the identification models, and may additionally assign weight coefficients to models based on the estimated accuracy.

Model memory 350 may include one or more storage devices configured to store instructions used by model processor 340 to perform operations related to disclosed embodiments. For example, model memory 350 may store software instructions, such as model program 352, that may perform operations when executed by model processor 340. In addition, model memory 350 may include model data 354, which may include images to train a convolutional neural network.

In certain embodiments, model memory 350 may store sets of instructions for carrying out processes to generate a model that identifies attributes of an ATM or bank.

Figure 4:
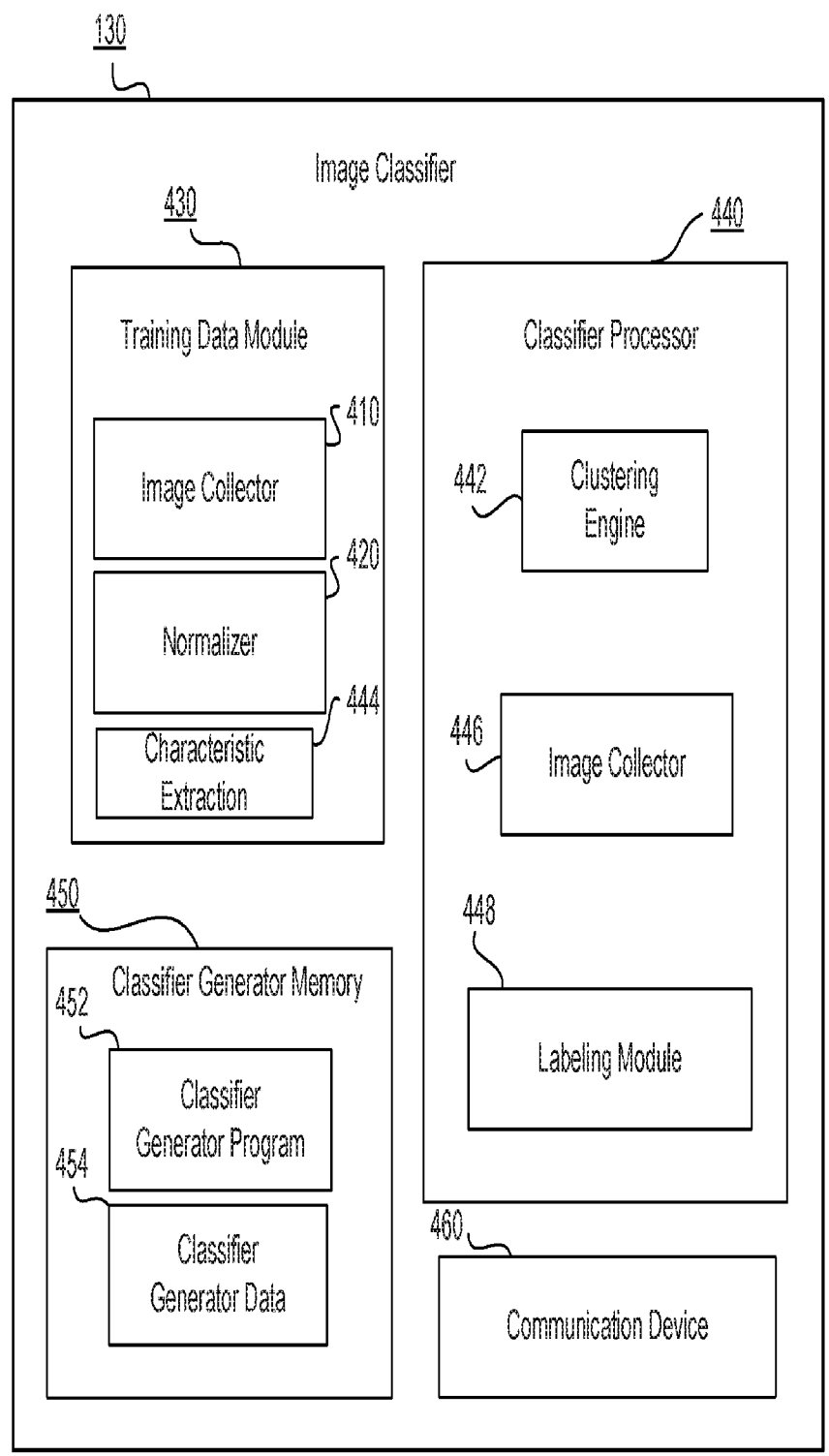
FIG. 4 is a block diagram of an exemplary image classifier, consistent with disclosed embodiments.

Referring now to FIG. 4, there is shown a block diagram of an exemplary image classifier 130, consistent with disclosed embodiments. Image classifier 130 may include a training data module 430, a classifier processor 440, and a classifier memory 450. In some embodiments, image classifier 130 may be configured to generate a group of synthetic images to be used as a training data set by model generator 120.

An issue that may prevent accurate image identification using machine learning algorithms is the lack of normalized images, and the inclusion of mislabeled images in a training data set. Billions of images are available online, but accurately selecting images to develop an identification model presents technical challenges. For example, because a very large quantity of images is required to generate accurate models, it is expensive and challenging to generate training data sets with standard computing methods. Also, although it is possible to input mislabeled images and let the machine learning algorithm identify outliers, this process may delay the development of the model and undermine its accuracy. Moreover, even when images may be identified, lack of information in the associated metadata may prevent the creation of validation data sets to test the accuracy of the identification model Therefore, to remedy the foregoing concerns, image classifier 130 (see FIG. 4) may generate synthetic images as a first step (see FIGS. 11 and 12), and inspection system 105 may then train the image recognizer using those synthetic images. The synthetic images may be generated by modeling the image environment and captured elements (e.g. human, ATM, door, etc.) in a 3D virtual environment analogous to a virtual world in a game engine. Consistent with this disclosure, virtual cameras may extract images of what an image sensor may see for classification by image classifier 130 and inspection system 105 may later use these synthetic images to train a neural network model.

As an alternative method for classification, it may be necessary for image classifier 130 to collect multiple images of users conducting financial transactions at an ATM or bank to identify a proper surveillance angle for a customer to train the model in order to identify an appropriate camera angle for an image that simultaneously complies with contemporaneous legal and privacy regulations. While search engines may be used to identify images associated with image sensor surveillance of an ATM, for example, a general search for "Bank ATM" would return many ATM or bank images, and the search results may include multiple images that are irrelevant and which may undermine the identification model. For example, the resulting images may include images of a keypad of an ATM, which are irrelevant for a surveillance camera angle identification application, and may be prohibited due to existing privacy regulations. Moreover, such general searches may also include promotional images that are not associated with surveillance. Therefore, in some alternative embodiments, it may become necessary to select a group of the resulting images before the model is trained to improve accuracy and time to identification. Indeed, for portable and augmented reality application in which time is crucial, curating the training data set to improve the identification efficiency improves the user experience.

Image classifier 130 may be configured to address these issues and facilitate the generation of groups of images for training convolutional networks. Image classifier 130 may include a data module 430 which includes an image collector 410, an image normalizer module 420, and a characteristic extraction module 444.

Image collector 410 may be configured to search for images associated with one or more keywords. In some embodiments, image collector 410 may collect images from online resources 140 and store them in classifier memory 450. In some embodiments, classifier memory 450 may store a large set of images for training one or more machine learning models. For example, classifier memory 450 may store at least one million images of ATMs and bank branch interiors to provide sufficient accuracy for a clustering engine 442 of classifier processor 440 (to be described below) and/or a logistic regression classifier. In some embodiments, image collector 410 may be in communication with servers and/or websites of banks and copy images therefrom into memory 450 for processing. Additionally, in some embodiments image collector 410 may be configured to detect changes in web sites of banks and, using a web scraper, collect images upon detection of such changes.

The collected images may have image metadata associated therewith. In some embodiments, image collector 410 may search the image metadata for items of interest, and classify images based on the image metadata. In some embodiments image collector 410 may perform a preliminary keyword search in the associated image metadata. For example, image collector 410 may search for the word "ATM" in image metadata and discard images whose associated metadata does not include the word "ATM." In such embodiments, image collector 410 may additionally search metadata for additional words or associated characteristics to assist in classifying the collected images. For instance, image collector may look for the word "bank" in the image metadata. Alternatively, image collector 410 may identify images based on XMP data. In some embodiments, image collector 410 may classify images as "characteristicless" if the metadata associated with the images does not provide enough information to classify the image.

Training data module 430 may additionally include an image normalization module 420, similar to the image normalization module 232. However, in some embodiments, image normalization module 420 may have a different model image resulting in a different normalized image. For example, the model image in image normalization module 420 may have a different format or different size.

Training data module 430 may have a characteristic extraction module 444 configured to extract characteristics of images. In some embodiments, characteristic extraction module 444 may be similar to the image characteristic extraction module 234. For example, image characteristic extraction module 234 may also be configured to extract characteristics by using a convolutional neural network.

In other embodiments, images that are collected by image collector 410 and normalized by image normalization module 420 may be processed by characteristic extraction module 444. For example, characteristic extraction module 444 may use max pooling layers, and mean, max, and L2 norm layers to computer data about the images it receives. The characteristic extraction module 444 may additionally generate a file with the characteristics it identified from the image.

In yet other embodiments, characteristic extraction module 444 may implement characteristic extraction techniques as compiled functions that feed-forward data into an architecture to the layer of interest in the neural network. For instance, characteristic extraction module 444 may implement the following script:

dense_layer=layers.get_output(net1.layers ['dense'], deterministic=True)
    output_layer=layers.get_output(net1.layers_['output'],
      deterministic=True)
    input_var=net1.layers_['input'].input_var
    f_output=t.function([input_var], output_layer)
    f_dense=t.function([input_var], dense_layer)

The above functions may generate activations for a dense layer or for layers positioned before output layers. In some embodiments, characteristic extraction module 444 may use this activation to determine image parameters.

In other embodiments, characteristic extraction module 444 may implement engineered characteristic extraction methods such as scale-invariant characteristic transformation, Vector of Locally Aggregated Descriptors (VLAD) encoding, or extractHOGCharacteristics, among others. Alternatively or additionally, characteristic extraction module 444 may use discriminative characteristics based in the given context (i.e., Sparse Coding, Auto Encoders, Restricted Boltzmann Machines, Principal Component Analysis (PCA), Independent Component Analysis (ICA), K-means).

Image classifier 130 may include a classifier processor 440 which may include clustering engine 442, regression calculator 446, and labeling module 448. In some embodiments, classifier processor 440 may cluster images based on the extracted characteristics using classifier processor 440 and particularly clustering engine 442.

In some embodiments, clustering engine 442 may perform a Density-Based Spatial Clustering of Applications with Noise (DBSCAN). In such embodiments, clustering engine 442 may find a distance between coordinates associated with the images to establish core points, find the connected components of core points on a neighbor graph, and assign each non-core point to a nearby cluster. In some embodiments, clustering engine 442 may be configured to only create two clusters in a binary generation process. Alternatively or additionally, the clustering engine 442 may eliminate images that are not clustered in one of the two clusters as outliers. In other embodiments, clustering engine 442 may use linear clustering techniques, such as reliability threshold clustering or logistic regressions, to cluster the coordinates associated with images. In yet other embodiments, clustering engine 442 may implement non-linear clustering algorithms such, as MST-based clustering.

In some embodiments, clustering engine 442 may transmit information to labeling module 448. Labeling module 448 may be configured to add or modify metadata associated with images clustered by clustering engine 442. For example, labeling module 448 may add comments to the metadata specifying a binary classification. In some embodiments, where clustering engine 442 clusters ATMs, the labeling module 448 may add a label of "bank" or "ATM" to the images in each cluster.

In some embodiments, a regression calculator 446 may generate a logistic regression classifier based on the images that have been labeled by labeling module 448. In some embodiments, regression calculator 446 may develop a sigmoid or logistic function that classifies images as "bank interior" or "bank exterior" based on the sample of labeled images. In such embodiments, regression calculator 446 may analyze the labeled images to determine one or more independent variables. Regression calculator 446 may then calculate an outcome, measured with a dichotomous variable (in which there are only two possible outcomes). Regression calculator 446 may then determine a classifier function that, given a set of image characteristics, may classify the image into one of two groups. For instance, regression calculator 446 may generate a function that receives an image of an environment of an ATM and determines where the image sensor may be positioned.

Classifier memory 450 may include one or more storage devices configured to store instructions used by classifier processor 440 to perform functions related to disclosed embodiments. For example, classifier memory 450 may store software instructions, such as classifier program 452, that may perform one or more operations using classifier generator data 454 when executed by classifier processor 440. Classifier processor 440 may also execute classifier memory 450 to communicate with communication device 460. In addition, classifier memory 450 may include model data 354 (from FIG. 3), which may include images for the regression calculator 446.

In certain embodiments, model memory 350 (in FIG. 3) may store sets of instructions for carrying out processes to generate a model that identifies attributes of an ATM or bank based on images from image classifier 130. For example, identification system 105 may execute processes stored in model memory 350 using information from image classifier 130 and/or data from training data module 430.

Figure 5:
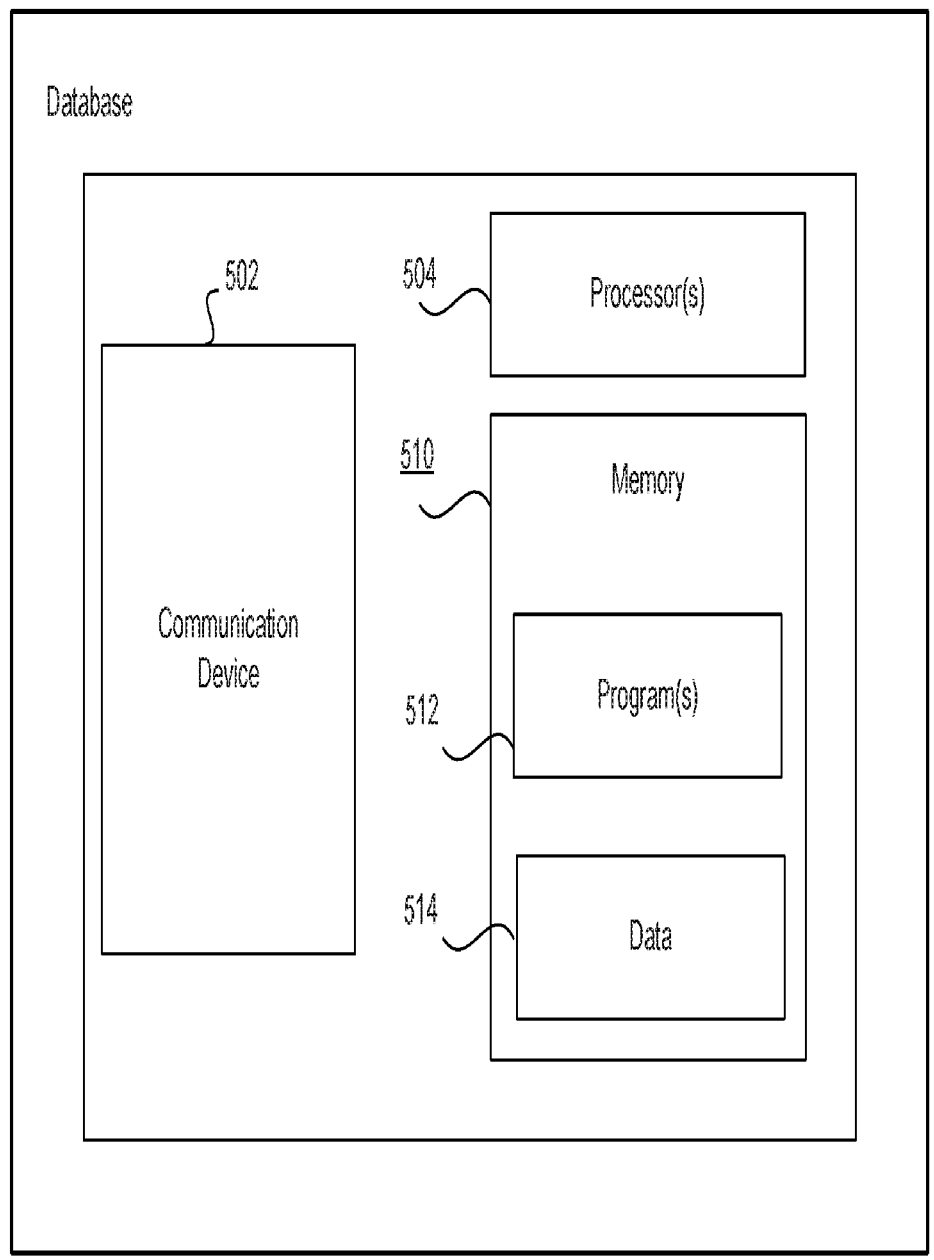
FIG. 5 is a block diagram of an exemplary database, consistent with disclosed embodiments.

Referring now to FIG. 5, there is shown a block diagram of an exemplary database 180, consistent with disclosed embodiments. Database 180 may include a communication device 502, one or more database processors 504, and database memory 510 including one or more database programs 512 and data 514.

In some embodiments, databases 180 may take the form of one or more servers, general purpose computers, mainframe computers, or any combination of these components capable of storing data. Other implementations consistent with disclosed embodiments are possible as well.

Communication device 502 may be configured to communicate with one or more components of system 100, such as online resource 140, identification system 105, model generator 120, image classifier 130, and/or client devices 150. In particular, communication device 502 may be configured to provide to model generator 120 and image classifier 130 images of ATMs or banks that may be used to generate a CNN or an identification model.

Communication device 502 may be configured to communicate with other components as well, including, for example, model memory 350 (from FIG. 3). Communication device 502 may take any of the forms described above for communication device 210 (shown in FIG. 2).

Database processors 504, database memory 510, database programs 512, and data 514 may take any of the forms described above for recognizer processors 230, memory 220, recognizer programs 222, and recognizer data 224, respectively, in connection with FIG. 2. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 514 may be data associated with websites, such as online resources 140. Data 514 may include, for example, information relating to websites of banks. Data 514 may include images of ATMs and information relating to banks, such as financial account information and/or captured surveillance image information.

Referring now to FIG. 6, there is shown a block diagram of an exemplary client device 150, consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access websites consistent with disclosed embodiments.

Processor 602 may include one or more known processing devices, such as single-core or multi-core microprocessors manufactured by companies such as Intel™, AMD™, Samsung™, Qualcomm™, Apple™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612, that may perform operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 610 may also store data 616 that is used by one or more programs 312 (FIG. 3).

In certain embodiments, memory 610 may store an ATM surveillance identification application 614 that may be executed by processor(s) 602 to perform one or more identification processes consistent with disclosed embodiments. In certain aspects, ATM surveillance identification application 614, or another software component, may be configured to request identification from identification system 105 or determine the location of client devices 150. For instance, these software instructions, when executed by processor(s) 602, may cause processor(s) 602 to process information to generate a request for hours of operation.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 604 may also include one or more digital and/or analog devices that allow a user to interact with client devices 150, such as a touch-sensitive area, buttons, or microphones. I/O devices 604 may also include one or more accelerometers to detect the orientation and inertia of client devices 150. I/O devices 604 may also include other components known in the art for interacting with identification system 105.

In some embodiments, client devices 150 may include an image sensor or camera 620 that may be configured to capture images or video and send it to other components of system 100 via, for example, network 170.

The components of client devices 150 may be implemented in hardware, software, or a combination of both hardware and software, as will be apparent to those skilled in the art.

Figure 7:
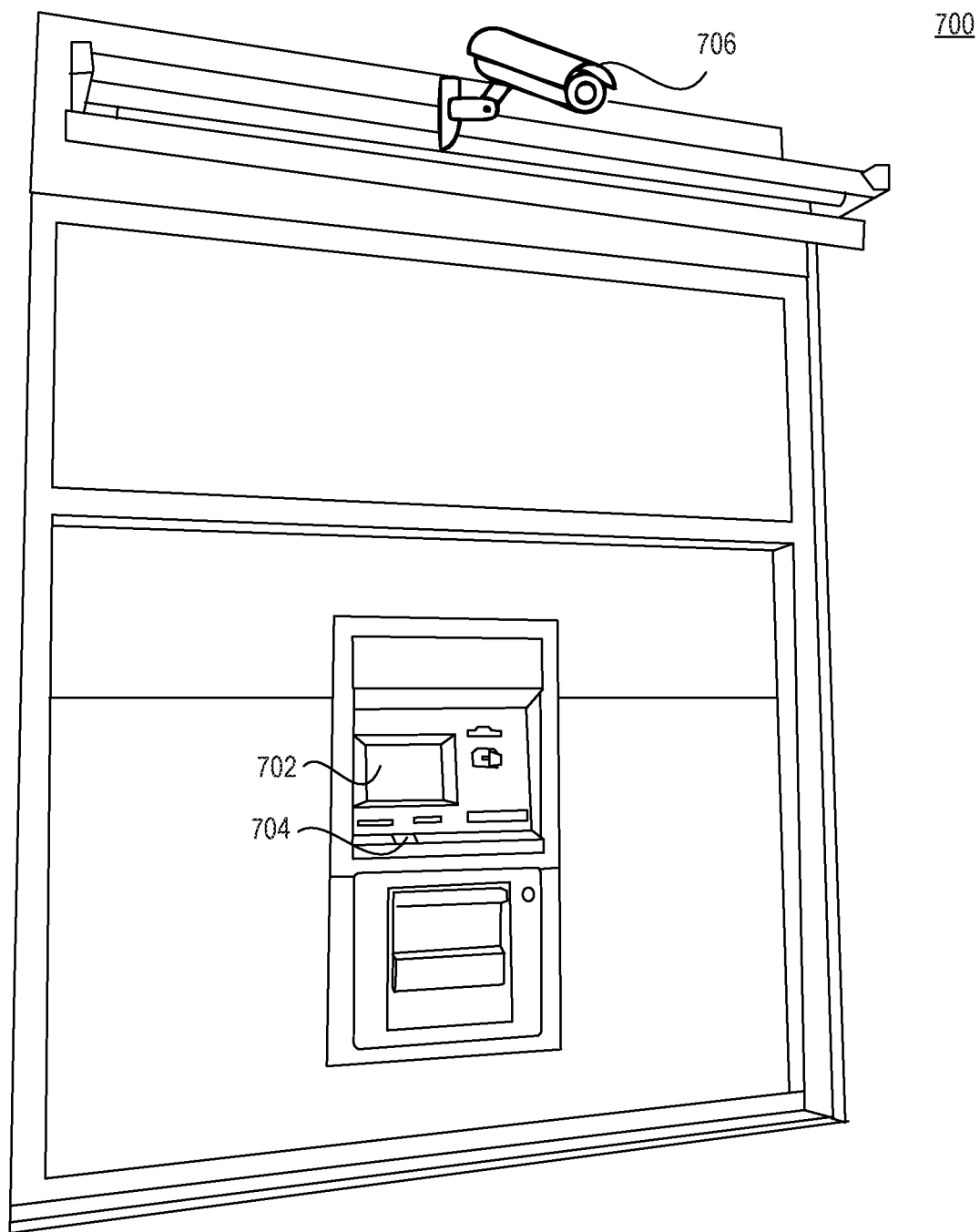
FIG. 7 depicts an example of a bank automated teller machine (ATM) with an image sensor, consistent with disclosed embodiments.
Figure 8:
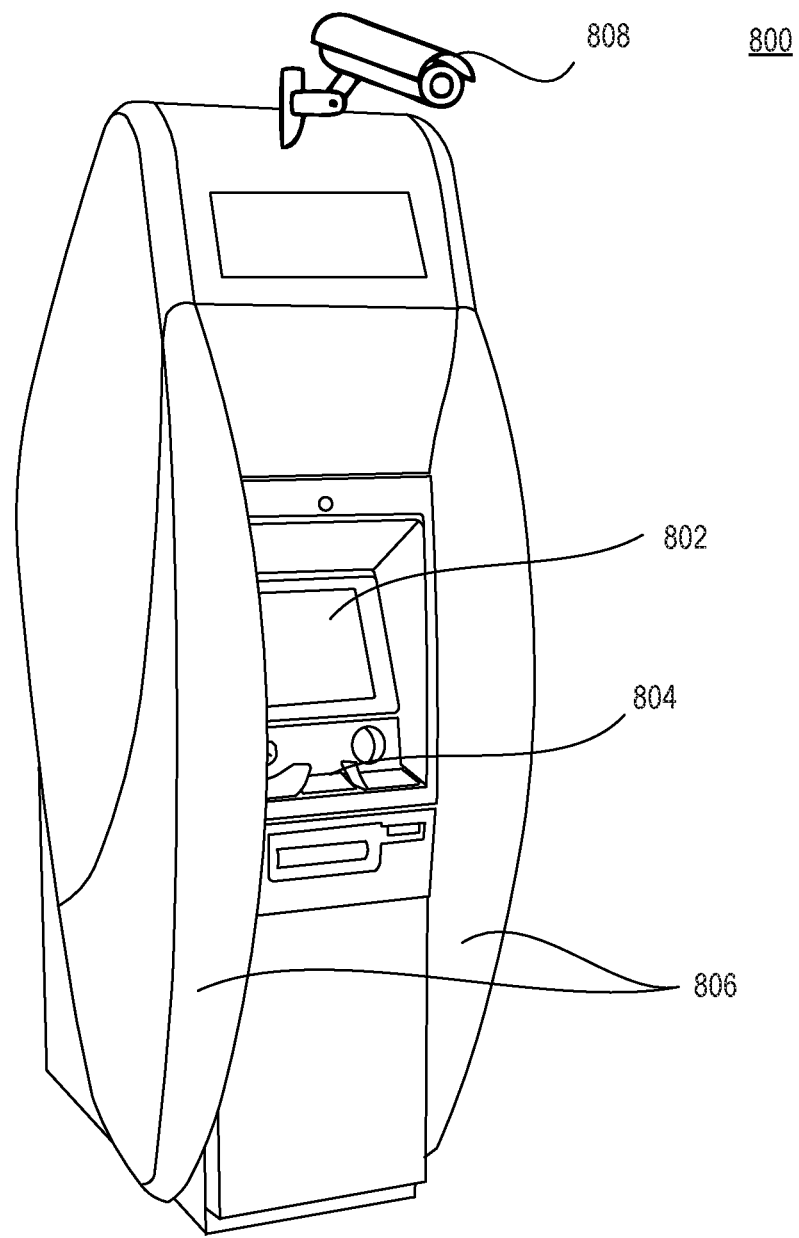
FIG. 8 depicts another example of an ATM with an image sensor, consistent with disclosed embodiments.
Figure 9:
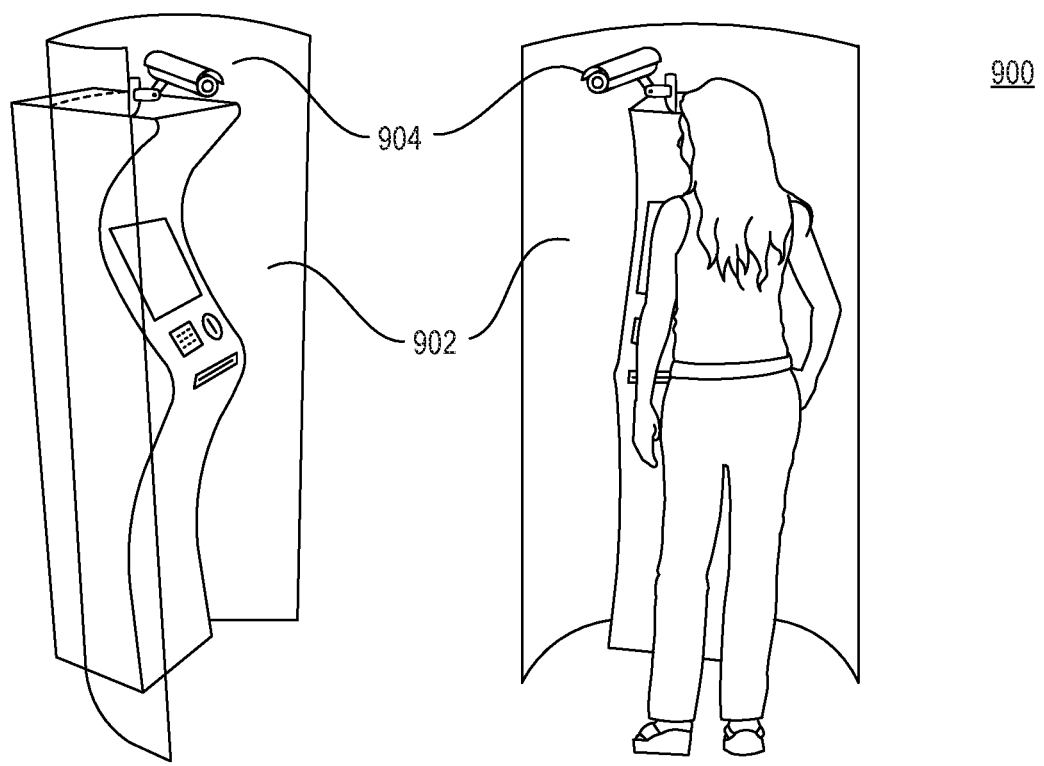
FIG. 9 depicts an example of a customer operating an ATM, consistent with disclosed embodiments.

FIGS. 7-9 depict automated teller machines (ATMs) 700, 800, and 900 consistent with disclosed embodiments. ATM 700 may comprise a local financial service provider (FSP) device positioned at a wall (as shown in FIG. 7). In some embodiments, ATM 700 may be constructed and arranged to provide an open and inviting environment, encouraging users to feel comfortable approaching ATM 700. ATM 700 may include a housing that may encase valuables, such as currency, checks, deposit slips, etc., and/or electronic components, such as processors, memory devices, circuits, etc. ATM 700 may be made of various materials, including plastics, metals, polymers, woods, ceramics, concretes, paper, glass, etc. In some embodiments (and as depicted in FIGS. 8-9), ATM 700 may have a different shape than the one shown in FIG. 7.

ATM 700 may include one or more surfaces. For example, ATM 700 may include a front surface, back surface (not shown in FIG. 7), top surface, bottom surface, and side surface. The number of surfaces of ATM 700 is not limited by the present disclosure, and some surfaces may be located behind a wall or another structure.

In some embodiments, ATM 700 may include one or more displays 702, key panels 704, card readers or slots (not shown), and/or image sensors 706. The components and/or the shapes of the components of the display and key panels are only illustrative. Other components may be included in ATM 700. In some embodiments, components, such as those shown in FIG. 7, may be replaced with other components or omitted from ATM 700.

Display 702 may include a Thin Film Transistor Liquid Crystal Display (LCD), In-Place Switching LCD, Resistive Touchscreen LCD, Capacitive Touchscreen LCD, an Organic Light Emitted Diode (OLED) Display, an Active-Matrix Organic Light-Emitting Diode (AMOLED) Display, a Super AMOLED, a Retina Display, a Haptic or Tactile touchscreen display, or any other display. Display 702 may be any known type of display device that presents information to a user operating ATM 700. Display 702 may be a touchscreen display, which allows the user to input instructions via display 702.

Other components, such as key panels 704, card readers and/or slots (not shown) may allow the user to input instructions. Card readers may allow a user to, in some embodiments, insert a transaction card into ATM 700. Card readers may allow a user to tap a transaction card or mobile device in front of a card reader to allow ATM 700 to acquire and/or collect transaction information from the transaction card via technologies, such as near-field communication (NFC) technology, Bluetooth™ technology, and/or radio-frequency identified technology, and/or wireless technology. Slots may allow a user of ATM 700 to insert or receive one or more receipts, deposits, withdrawals, mini account statements, cash, checks, money orders, etc.

Sensors 706 may include any number of sensors configured to observe one or more conditions related to the use and operation of ATM 700 or activity in ATM 700's environment. Sensors 706 may include cameras, image sensors, microphones, proximity sensors, pressure sensors, infrared sensors, motion sensors, vibration sensors, smoke sensors, etc. Sensor 706 as shown in FIG. 7 may be configured to capture an image in the environment of ATM 700. Sensor 706 may be located at any appropriate location or locations of ATM 700, and may also be configured to capture the full face of a customer operating the ATM 700 (not shown). Consistent with this disclosure, sensor 706 may be automatically repositioned at an optimum angle based on a comparison with a synthetic training data set and classification of images representative of an ATM environment. A synthetic training data say may be, for example, a data set created for the sole purpose of training repositioning sensor 706 and not based on captured images from an environment of ATM 700. The repositioning may be, for example, automatic (electronic in nature using one or more servers or motors), or by manual repositioning by a site administrator based on an angle determined using techniques disclosed herein. Those of skill in the art will understand that numerous configurations of sensors 706 may be employed consistent with the present disclosure.

FIG. 8 depicts another example of an ATM 800 with an image sensor 808, consistent with disclosed embodiments. ATM 800 may include components similar to ATM 700 but is not connected to a wall. ATM 800 may include a display 802, keypad 804, and privacy barriers 806. FIG. 9 depicts an example of a customer or user operating an ATM, consistent with disclosed embodiments. ATM 900 may include components similar to ATMs 700 and 800, including privacy barriers 902 and surveillance image sensors 904. Image sensors 904 may be configured to capture the full face of a customer operating the ATM 900. A plurality of image sensors 904 may be positioned on or near ATM 900 at an ideal angle, consistent with this disclosure. Image sensors 904 may be automatically repositioned at an optimum angle based on a comparison with a synthetic training data set and classification of images representative of an ATM environment. The repositioning may be automatic (electronic in nature using one or more servers or motors), or by manual repositioning by a site administrator based on an angle determined using techniques disclosed herein. The positioning angles of image sensor 904 may be the same or different in order to capture the full face of a customer operating the ATM 900.

Figure 10:
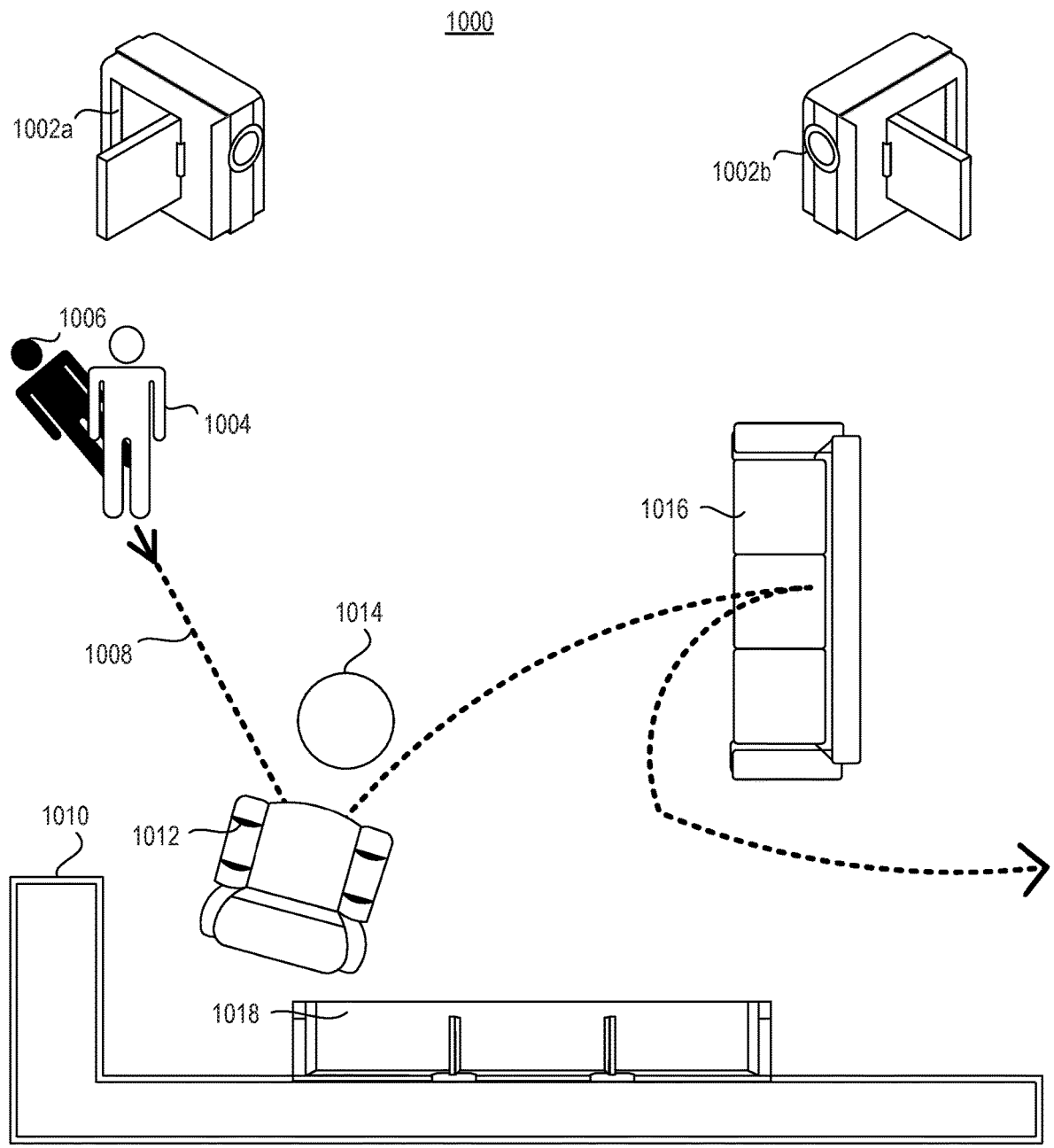
FIG. 10 depicts an example of surveillance of a customer at a bank in a three-dimensional video setting, consistent with disclosed embodiments.

FIG. 10 depicts an example of surveillance of a customer at a bank, consistent with disclosed embodiments. In particular, FIG. 10 is a diagram of an exemplary configuration of a three-dimensional video setting 1000, consistent with disclosed embodiments. As shown, video setting 1000 includes a synthetic setting, which may be a digital representation of a real setting as captured by a camera, or may be a digital representation fabricated by identification system 105. Video setting 1000 may be configured for use with a model training module (e.g. model generator 120 and/or training data module 430), consistent with this disclosure. Video setting 1000 may include a synthetic person 1004, a synthetic shadow 1006, and a path 1008. Video setting 1000 also includes a plurality of objects that includes a wall 1010, a chair 1012, a table 1014, a couch 1016, and a bookshelf 1018, which may be found in an interior of a bank. A bank teller is not shown, but may be included consistent with this embodiment. The plurality of objects may be based on images of real objects in a real-world location and/or may be synthetic objects. As shown, video setting 1000 includes observation points 1002a and 1002b having respective perspectives (positions, zooms, viewing angles). Real-time captured images may be compared relative to the synthetic video setting 1000 in order to adjust the positioning of image sensor angle observation points 1002a and 1002b to provide optimum surveillance.

FIG. 10 is provided for purposes of illustration only and is not intended to limit the disclosed embodiments. For example, as compared to the depiction in FIG. 10, a video system may include a larger or smaller number of objects, synthetic persons, synthetic shadows, paths, light sources, and/or observation points. In addition, the video setting as shown in FIG. 10 may further include additional or different objects, synthetic persons, synthetic shadows, paths, light sources, observation points, and/or other elements not depicted, consistent with the disclosed embodiments.

In some embodiments, observation points 1002a and 1002b are virtual observation points, and synthetic videos in video setting 1000 are generated from the perspective of the virtual observation points. In some embodiments, observation points 1002a and 1002b are observation points associated with real cameras. In some embodiments, the observation points may be fixed. In some embodiments, the observation points may change perspective by panning, zooming, rotating, or otherwise change perspective, and this change may be the result of automatically repositioning the observation points to be positioned at optimum angles based on a comparison with a synthetic training data set and classification of images representative of the bank environment. The repositioning may be automatic (electronic in nature) but manual repositioning by a site administrator may also be employed.

In some embodiments, observation point 1002a and/or observation point 1002b may be associated with real cameras having known perspectives of their respective observation points (i.e., known camera position, known camera zoom, and known camera viewing angle). In some embodiments, a device comprising a camera associated with observation point 1002a and/or observation point 1002b may transmit data to an image processing system (e.g., client device and/or synthetic video identification system). A synthetic video system may be identical to identification system 105 (as shown in FIG. 1) and may execute processes stored in model memory 350 using information from image classifier 130 and/or data from training data module 430.

In some embodiments, the image processing system may generate spatial data of video setting 1000 based on the captured image data, consistent with disclosed embodiments. For example, using methods of homography, the program may detect object edges, identify objects, and/or determine distances between edges in three dimensions.

In some embodiments, in a synthetic video generated for video setting 1000, synthetic person 1004 may follow path 1008 to walk to chair 1012, sit on chair 1012, walk to couch 1016, sit on couch 1016, then walk to exit to the right. In some embodiments, synthetic person 1004 may interact with objects in video scene 1000 (e.g., move table 1014; take something off bookshelf 1018). Synthetic person 1004 may be a regular bank customer or may be a bank robber. Image inspection system (also known as identification system) 105 may generate synthetic person 1004 for surveillance purposes, consistent with disclosed embodiments. Inspection system 105 may further generate video setting 1000 for use with a model training module (e.g. model generator 120 and/or training data module 430) consistent with this disclosure.

Referring now to FIG. 11, there is shown a flow chart of an exemplary first inspection process 1100, consistent with disclosed embodiments. In some embodiments, first inspection process 1100 may be executed by identification system 105 (which may include image recognizer 110, model generator 120, and image classifier 130).

In step 1102, identification system 105 (FIG. 1) may obtain, or generate, a plurality of synthetic images, the synthetic images representing a range of scenes. The range of scenes may include at least one of a face looking at the image sensor or a keypad of an automated teller machine (ATM). Inspection system 105 may first generate a large amount of synthetic images of the same scene, with small variations from one image to another. For example, a large amount of synthetic images may include tens of thousands of images, and small variations may include small differences in captured objects, including position, color, and orientation in a particular frame with respect to the same scene. Identification system 105 (FIG. 1) may also receive a plurality of synthetic images from stored databases and online resources.

In step 1104, identification system 105 (FIG. 1) may train a classification model (M1). Identification system 105 may train M1 to classify, based on the synthetic images, a plurality of images captured from an environment of a user by an image sensor. Identification system 105 may also train at least one of a logistic regression model, convolutional neural network, and other supervised machine learning classification techniques. Synthetic images may be fed to model M1 at a training time. The process of synthetic image generation may take a short or brief amount of computer time. The process of training M1 may take additional computer time. Once done, M1 may be deployed and may have an idea of what it is that it is trained to look for. For example, if 10s of thousands of images show a variety of doors in all positions, shapes, colors, open/closed/half-open, etc., M1 now has an enhanced idea of what a door looks like in any image. More specifically, M1 may be able to examine its model and compare doors in all positions, shapes, colors in order to teach the model of an appearance of a door for any prospective image.

In step 1106, identification system 105 (FIG. 1) may capture a plurality of images from an environment of a customer or user. Image sensor 620 (as shown in FIG. 6) may be used to capture images from the environment of the user. In step 1108, identification system 105 (FIG. 1) may classify the adherence of environment images using M1. For example, an environmental image from step 1106 may be transmitted to M1. Additionally, the environmental image may display a door, and M1 may not need to generate additional synthetic images because the knowledge of the appearance of the door may be previously embedded within the weights (synapse weights) of neural network model M1. In addition, consistent with this disclosure, M1 may inform inspection system 105 if the environment image contains a door or not, where the output may be binary "yes/no," or "yes, there is a door in this image," or "no, there are no doors in this image." Other textual outputs may be contemplated. In other embodiments, M1 may not only be able to identify a door, but also may identify a user of a pixel or distance position exactly in the image where the door is located. In some embodiments, every pixel in the image may be classified as if the pixel belongs to an object representing a door (or a face, or ATM keypad, or a cat or dog, etc.).

In step 1110, identification system 105 (FIG. 1) may determine the position of the image sensor. For example, identification system 105 (FIG. 1) may determine that the user is operating an automated teller machine (ATM) or bank branch (or that a door exists in an image) and based on the determination, alter the position of the image sensor. Identification system 105 (FIG. 1) may also determine that the face of the user is looking at the image sensor, and based on the determination, alter the position of the image sensor. Altering of the position of the image sensor may also be performed according to the following equation:

$$\text{Distance to object(mm)} = \frac{f(\text{mm}) \times \text{real height(mm)} \times \text{image height(pixels)}}{\text{object height(pixels)} \times \text{sensor height(mm)}}$$

In step 1112, identification system 105 (FIG. 1) may calculate image sensor position adjustments. With this common equation for calculating a distance to an object, statistical models consistent with this disclosure may determine an ideal image sensor angle using the heights of known objects in the background. For example, the system may assume a common door height of 6 feet 8 inches (real height) of a door in the background of the image, and calculate the pixels of the image (image height) by deep learning models such as Fast R-CNN (or other models) to identify the door. As a result, the model may estimate the height of the door in pixels (object height), and the sensor height may be determined from the install specifications for an image sensor positioned on an ATM or in a bank. Additionally, the focal length of the image sensor may be pre-set for calculation in relation to the distance to the object.

In other aspects, where the object is centered within a captured image frame, M1 may first calculate an image angle change on a vertical axis with pixel height and object height as a fixed ratio to determine how far down or up (in terms of pixels) the image sensor needs to move or be repositioned along the vertical axis. With two known side lengths of a triangle, M1 may determine the current positioning angle of the image sensor. In particular, M1 may calculate an inverse tangent of the distance from a bottom of the door to the top of the image frame and distance to an object and the inverse tangent of the desired distance down as well as the distance to the object. This determination may be repeated for a horizontal axis to determine the desired change in position and desired change of the image sensor angle so as to place the image sensor at an ideal angle. Other methods may be contemplated where a door is not present in order to provide for calculation of image sensor angle for readjusting an image sensor. Consistent with this disclosure, image sensors may be automatically repositioned at an optimum angle based on a comparison with a synthetic training data set and classification of images representative of an ATM or bank environment. The repositioning may be, for example, automatic (electronic in nature using one or more servers or motors). Identification system 105 (FIG. 1) may perform additional calculations to determine a change in image sensor position.

In step 1114, identification system 105 (FIG. 1) may generate and output image sensor adjustment instructions. Output instructions may be provided as a visual, printed, or audible output as instructions to a user, or system 105 may output instructions to one or more motors or robotic devices to adjust the camera. As defined herein, the term "position" may indicate the "angle" at which an image sensor is positioned relative to a captured object and may also indicate a distance or height as discussed above. The repositioning of a "position" or change of an "angle" of an image sensor may also be a manual repositioning by a site administrator based on an angle determined using techniques disclosed herein. Both the position and angle of the image sensor may be adjusted, consistent with this disclosure.

Referring now to FIG. 12, there is shown a flow chart of an exemplary second inspection process 1200, consistent with disclosed embodiments. In some embodiments, first inspection process 1200 may be executed by identification system 105 (which may include image recognizer 110, model generator 120, and image classifier 130).

In step 1202, identification system 105 (FIG. 1) may obtain a plurality of synthetic images, the synthetic images representing a range of scenes. The range of scenes may include at least one of a face looking at the image sensor or a keypad of an automated teller machine (ATM). Identification system 105 (FIG. 1) may also receive a plurality of synthetic images from stored databases and online resources.

In step 1204, identification system 105 (FIG. 1) may capture a plurality of images from an environment of a customer or user. Identification system 105 (FIG. 1) may train a classification model (M2) to classify, based on the synthetic images, a plurality of images captured from an environment of a user by an image sensor. Identification system 105 may compare the plurality of synthetic images to the images captured from the environment of the user by the image sensor and may train M2 based on the comparison. Identification system 105 may also train at least one of a logistic regression model, convolutional neural network, and other supervised machine learning classification techniques. Identification system 105 (FIG. 1) may further comprise a mobile device having an image sensor that is configured to capture images or video for surveillance. Consistent with this disclosure, an optimum image sensor angle may also be determined for an image sensor positioned on a mobile device In step 1206, identification system 105 (FIG. 1) may re-train M2 and may determine, based on the re-trained classification, whether the image sensor is positioned at a predetermined angle. Identification system 105 (FIG. 1) may first examine the classification of the examined images to determine the angular position of the image sensor at step 1108 and may determine whether re-training of the M2 is necessary. Identification system 105 (FIG. 1) may compare the detected angular position of the image sensor to a predetermined image sensor angle stored in a database 180. The angular position may be determined based on real height (millimeters) or based on image height (pixels) as discussed above. Identification system 105 (FIG. 1) may re-train M2 based on the determination of angular position relative to the classification of images and based on reinforcement learning over time by the classification model resulting from examination of a plurality of images captured from the image environment In step 1210, identification system 105 (FIG. 1) may adjust, based on the identification, the position of the image sensor. Identification system 105 (FIG. 1) may determine that the user is operating an automated teller machine (ATM) or bank branch and based on the determination, alter the position of the image sensor. Identification system 105 (FIG. 1) may determine that the face of the user is looking at the image sensor, and based on the determination, alter the position of the image sensor. Altering of the position of the image sensor may also be performed according to the following equation:

$$\text{Distance to object(mm)} = \frac{f(\text{mm}) \times \text{real height(mm)} \times \text{image height(pixels)}}{\text{object height(pixels)} \times \text{sensor height(mm)}}$$

As discussed above (with reference to FIG. 11), with this common equation for calculating a distance to an object, statistical models consistent with this disclosure may determine an ideal image sensor angle using the heights of known objects in the background. For example, the system may assume a common door height of 6 feet 8 inches (real height) of a door in the background of the image, and calculate the pixels of the image (image height) by deep learning models such as Fast R-CNN (or other models) to identify the door. As a result, M2 may estimate the height of the door in pixels (object height), and the sensor height may be determined from the install specifications for an image sensor positioned on an ATM or in a bank. Additionally, the focal length of the image sensor may be pre-set for calculation in relation to the distance to the object.

In other aspects, where the object is centered within a captured image frame, M2 may first calculate an image angle change on a vertical axis with pixel height and object height as a fixed ratio to determine how far down or up (in terms of pixels) the image sensor needs to move or be repositioned along the vertical axis. With two known side lengths of a triangle, M2 may determine the current positioning angle of the image sensor. In particular, M2 may calculate an inverse tangent of the distance from a bottom of the door to the top of the image frame and distance to an object and the inverse tangent of the desired distance down as well as the distance to the object. This determination may be repeated for a horizontal axis to determine the desired change in position and desired change of the image sensor angle so as to place the image sensor at an ideal angle. Other methods may be contemplated where a door is not present in order to provide for calculation of image sensor angle for readjusting an image sensor. Consistent with this disclosure, image sensors may be automatically repositioned at an optimum angle based on a comparison with a synthetic training data set and classification of images representative of an ATM or bank environment. The repositioning may be, for example, automatic (electronic in nature using one or more servers or motors), or by manual repositioning by a site administrator based on an angle determined using techniques disclosed herein.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for guiding image sensor angle settings for an automated teller machine (ATM) environment, the system comprising:
  a memory storing computer program instructions; and
  at least one processor configured to execute the computer program instructions to perform operations comprising:
    obtaining, via an image sensor, a live image stream of an ATM environment;
    identifying a match between a live scene in the live image stream of the ATM environment and a first synthetic scene of a set of synthetic scenes, wherein the synthetic scenes comprise a plurality of synthetic scenes; and
    causing, based on the identification of the match between the live scene and the first synthetic scene, image sensor angle parameters of the image sensor to be adjusted such that the live scene becomes more similar to the first synthetic scene with respect to a criteria set.

2. The system of claim 1, wherein identifying the match between the live scene in the live image stream of the ATM environment and the first synthetic scene comprises:
  determining, via a classification model, a first classification for the live scene in the image stream of the ATM environment,
  wherein the classification model indicates that the live scene matches the first synthetic scene corresponding to the first classification.

3. A computer-implemented method comprising:
  obtaining, via an image sensor, an image stream of a kiosk environment;
  identifying a match between a live scene in the image stream of the kiosk environment and a first synthetic scene of a set of synthetic scenes, wherein the synthetic scenes comprise a plurality of synthetic scenes; and
  causing, based on the identification of the match between the live scene and the first synthetic scene, image sensor angle parameters of the image sensor to be adjusted such that the live scene becomes more similar to the first synthetic scene with respect to a criteria set.

4. The computer-implemented method of claim 3, wherein causing the adjustment of the image sensor angle parameters of the image sensor comprises adjusting the image sensor angle parameters of the image sensor from a different set of image sensor angle parameters to a first set of image sensor angle parameters corresponding to the first synthetic scene.

5. The computer-implemented method of claim 3, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream becomes more similar to the first synthetic scene as a result of the adjustment to the first set of image sensor angle parameters.

6. The computer-implemented method of claim 3, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream avoids capturing one or more portions of an input device of a kiosk in the kiosk environment as a result of the adjustment to the first set of image sensor angle parameters.

7. The computer-implemented method of claim 3, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream includes a face of an individual in the kiosk environment as a result of the adjustment to the first set of image sensor angle parameters.

8. The computer-implemented method of claim 3, further comprising:
   detecting, via one or more sensors, use of a kiosk by a user in the kiosk environment,
   wherein causing the adjustment of the image sensor angle parameters of the image sensor comprises causing the adjustment of the image sensor angle parameters of the image sensor based on (i) an identification of a first classification for the live scene, (ii) a first set of image sensor angle parameters corresponding to the first synthetic scene, and (iii) the detection of the use of the kiosk by the user.

9. The computer-implemented method of claim 3, wherein identifying the match between the live scene in the image stream of the kiosk environment and the first synthetic scene comprises:
   determining, via a classification model, a first classification for the live scene in the image stream of the kiosk environment,
   wherein the classification model indicates that the live scene matches the first synthetic scene corresponding to the first classification.

10. The computer-implemented method of claim 3, wherein identifying the match between the live scene in the image stream of the kiosk environment and the first synthetic scene comprises:
    determining, via a neural network, a first classification for the live scene in the image stream of the kiosk environment,
    wherein the neural network is trained on a collection of synthetic images depicting synthetic scenes.

11. One or more non-transitory computer-readable media comprising instructions that, when executed by one or more processors, cause operations comprising:
    obtaining, via an image sensor, an image stream of an environment;
    identifying a match between a live scene in the image stream of the environment and a first synthetic scene of a set of synthetic scenes; and
    causing, based on the match, image sensor angle parameters of the image sensor to be adjusted such that the live scene becomes more similar to the first synthetic scene.

12. The media of claim 11, wherein causing the adjustment of the image sensor angle parameters of the image sensor comprises adjusting the image sensor angle parameters of the image sensor from a different set of image sensor angle parameters to a first set of image sensor angle parameters corresponding to the first synthetic scene.

13. The media of claim 11, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream becomes more similar to the first synthetic scene as a result of the adjustment to the first set of image sensor angle parameters.

14. The media of claim 11, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream avoids capturing one or more portions of an input device in the environment as a result of the adjustment to the first set of image sensor angle parameters.

15. The media of claim 11, wherein causing the adjustment of the image sensor angle parameters of the image sensor comprises causing the adjustment of the image sensor angle parameters of the image sensor based on (i) an identification of a first classification for the live scene and (ii) a first set of image sensor angle parameters corresponding to the first synthetic scene such that the live scene in the image stream includes a face of an individual in the environment as a result of the adjustment to the first set of image sensor angle parameters.

16. The media of claim 11, further comprising:
    detecting, via one or more sensors, use of a kiosk by a user in the environment,
    wherein causing the adjustment of the image sensor angle parameters of the image sensor comprises causing the adjustment of the image sensor angle parameters of the image sensor based on (i) an identification of a first classification for the live scene, (ii) a first set of image sensor angle parameters corresponding to the first synthetic scene, and (iii) the detection of the use of the kiosk by the user.

17. The media of claim 11, wherein identifying the match between the live scene in the image stream of the environment and the first synthetic scene comprises:

determining, via a classification model, a first classification for the live scene in the image stream of the environment,
wherein the classification model indicates that the live scene matches the first synthetic scene corresponding to the first classification.

18. The media of claim 11, wherein identifying the match between the live scene in the image stream of the environment and the first synthetic scene comprises:
determining, via a neural network, a first classification for the live scene in the image stream of the environment,
wherein the neural network is trained on a collection of synthetic images depicting synthetic scenes.

19. The media of claim 11, wherein causing the adjustment of the image sensor angle parameters of the image sensor comprises causing an adjustment of an angular position of the image sensor based on (i) an identification of a first classification for the live scene and (ii) a first angular position of a first set of image sensor angle parameters corresponding to the first synthetic scene.

20. The media of claim 11, wherein causing the adjustment of the image sensor angle parameters of the image sensor comprises causing an adjustment of an orientation of the image sensor based on (i) an identification of a first classification for the live scene and (ii) a first orientation of a first set of image sensor angle parameters corresponding to the first synthetic scene.

\* \* \* \* \*